(12) United States Patent
Khan et al.

(10) Patent No.: US 11,405,272 B1
(45) Date of Patent: Aug. 2, 2022

(54) SYSTEM AND METHOD TO DEBUG, OPTIMIZE, PROFILE, OR RECOVER NETWORK DEVICE IN LIVE NETWORK

(71) Applicant: Cisco Technology, Inc., San Jose, CA (US)

(72) Inventors: Riaz Khan, Milpitas, CA (US); Atri Indiresan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/332,248

(22) Filed: May 27, 2021

(51) Int. Cl.
| | |
|---|---|
| *H04L 41/0816* | (2022.01) |
| *H04L 41/08* | (2022.01) |
| *H04L 41/0604* | (2022.01) |
| *G06F 11/36* | (2006.01) |
| *H04L 43/50* | (2022.01) |
| *H04L 12/46* | (2006.01) |
| *H04L 45/28* | (2022.01) |

(52) U.S. Cl.
CPC ...... *H04L 41/0816* (2013.01); *G06F 11/3656* (2013.01); *G06F 11/3664* (2013.01); *H04L 12/4633* (2013.01); *H04L 41/0627* (2013.01); *H04L 41/0886* (2013.01); *H04L 43/50* (2013.01); *H04L 45/28* (2013.01)

(58) Field of Classification Search
CPC ............ H04L 41/0816; H04L 41/0627; H04L 41/0886; H04L 12/4633; H04L 43/50; H04L 43/28; G06F 11/3656; G06F 11/3664
See application file for complete search history.

(56) References Cited

U.S. PATENT DOCUMENTS

2019/0097926 A1 * 3/2019 Raj ................. H04L 45/583
2021/0255844 A1 * 8/2021 Wang ............... H04L 43/12

* cited by examiner

*Primary Examiner* — Brian Whipple
(74) *Attorney, Agent, or Firm* — Meunier Carlin & Curfman, LLC

(57) ABSTRACT

An exemplary method is disclosed that facilitate the on-demand creation of an exemplary instrumented network device in a cloud infrastructure, remote server, evaluation platform, or customized testing server and to form a stack between the instrumented network device as a debug network device and a target network device. The control plane of the target network device then switches over, via a switchover operation, to the control plane of the debug network device, while the data-plane of the target network device continues to operate. Once switched over, the instrumentation (e.g., hardware or software) of the control plane or debug network device facilitates the debug, optimization, profile, and/or recovery of the physical network device, even in a live network.

20 Claims, 13 Drawing Sheets

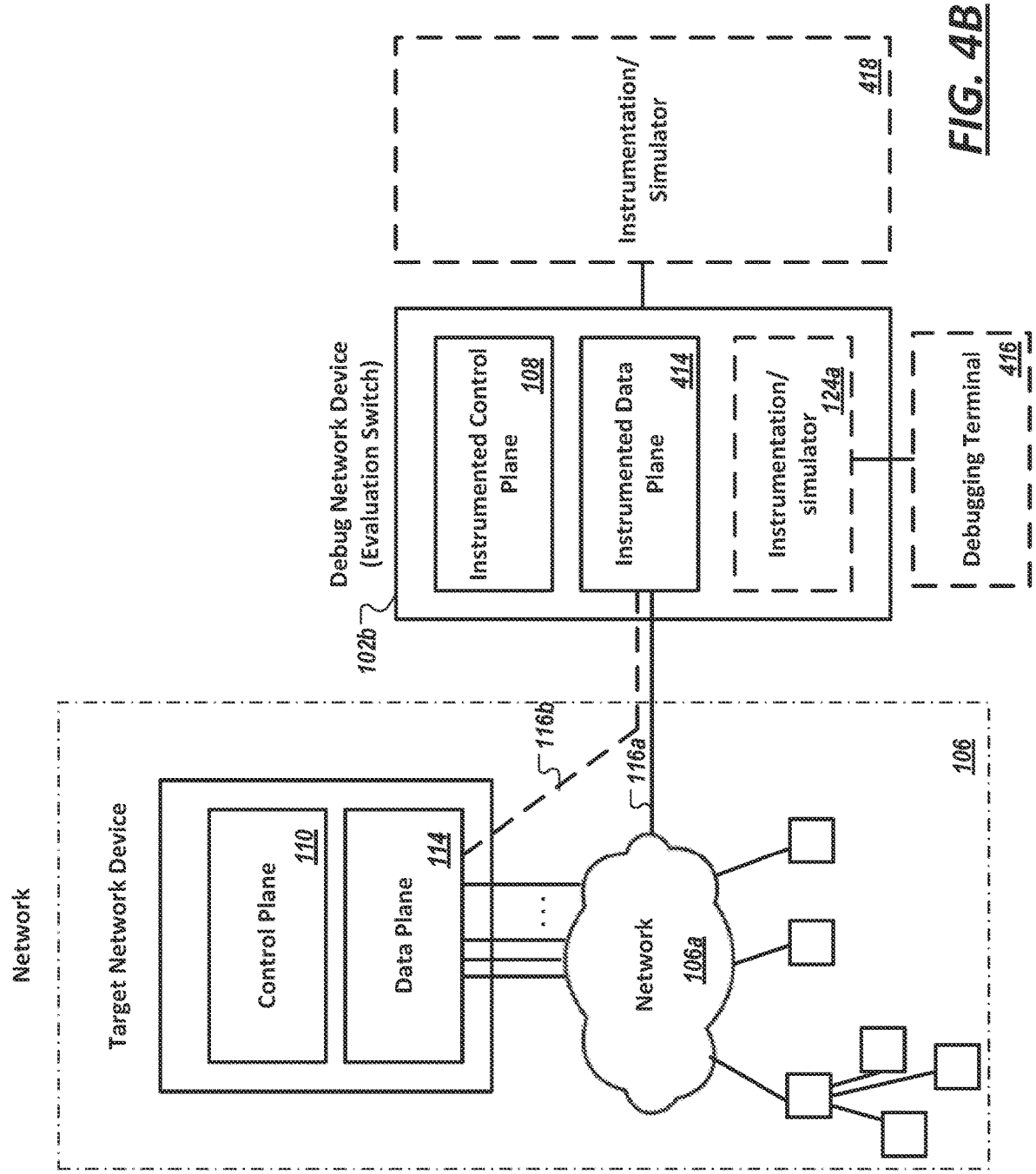

SYSTEM AND METHOD TO DEBUG, OPTIMIZE, PROFILE, OR RECOVER NETWORK DEVICE IN LIVE NETWORK

TECHNICAL FIELD

Embodiments of the present invention relate to networking equipment, in particular, hardware and software architecture and components that provide a debug network device and environment in switchover operations.

BACKGROUND

With the growing number of features, products, SKUs and configurations/templates, it is impractical to test and validate every combination for their interoperability. Hence, issues and bugs (within hardware, software, and middleware) in network and network devices are inevitable. The more severe of these issues can lead to disruption in network operations. Network equipment manufacturers often expend large amount of technical resources and capital resources to address such issues.

At the same time, network device manufacturers often design and configure release images for running in production network devices that are optimally configured for performance and cost. Release images may include the operating system for a given network device and instructions for routing protocol and debugging capabilities (e.g., command line). However, in that production configuration, network devices are configured to generate the minimal and often only essential profiling/debug information. While it is possible to anticipate certain issues, it is not practical to anticipate and include extensive debugging features (e.g., counters, debugs or trace logs) to debug every potential problem that could arise. Doing so could severely impact performance and consume the finite system resources in a given production network device (e.g., switch). For example, a network equipment manufacturer may include debugging elements in the most common code-path. While this approach may work well to reverse engineer or perform root-cause analysis for most functional and logic related bugs/issues, there are a subset of functional and timing related issues (e.g., in ASIC, hardware, firmware, hardware-software interactions etc.) that are more difficult to troubleshoot and to determine its root-cause. Many issues end up being debugged in a laboratory environment having an equivalent network environment setup and running instrumented images in order to collect more data for debugging. It may take weeks and months to debug and root-cause certain issues in this situation, and network equipment manufacturers can expend significant resources of their technical assistance center (TAC) and field engineering staff to address them.

In addition, the design trends toward the use of embedded systems leveraging open-source software, vendor IP, and off-the-shelf modules have interoperability issues since these elements may not have been designed, tested, or configured to operate together. In addition, troubleshooting can be extremely difficult as the customer network conditions, environment, and configuration are difficult to reproduce, if not irreproducible under the same conditions. When a technical assistance center (TAC) staff and field engineers are allowed to troubleshoot a problem at a live customer site, they would troubleshoot these cases either by first using the manufacturer-provided debugging functionality of the production switches or in certain cases by implementing instrumented images on problematic node(s). Network administrators (network owners) are often hesitant about debugging through instrumented images as it disrupts business operations and often set aside maintenance windows when the instrumented image may be implemented in a live network device to collect more data. That time window may not necessarily capture the issue if it is intermittent or occurs during certain network conditions (e.g., peak-time).

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4B is a diagram of a debug network device configured in an evaluation switch in accordance with various illustrative embodiments.

DESCRIPTION OF THE EXAMPLE EMBODIMENTS

Overview

Figure 1:
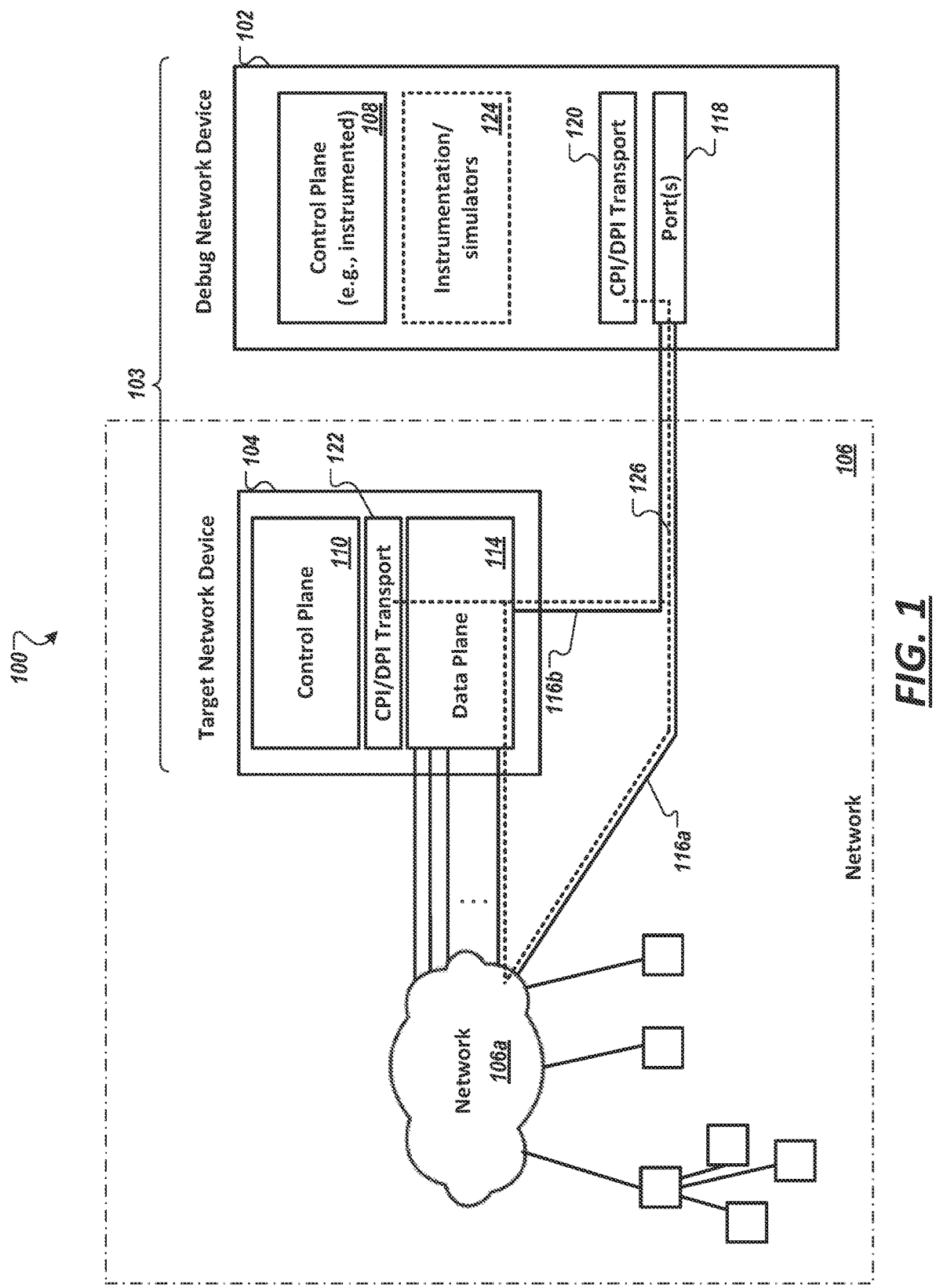
FIG. 1 shows a diagram of a debug network device that is created on-demand to form a stack with a target network device located in a network in accordance with an illustrative embodiment.

An exemplary method is disclosed that facilitates the on-demand creation of an exemplary instrumented network device in a cloud infrastructure (or remote server, evaluation platform, or customized testing server) and to form a stack (e.g., using stacking mechanism) between the instrumented network device (as a debug network device) and a target network device (e.g., such as physical network switch or switch fabric equipment that includes base debugging capabilities). The control plane of the target network device then switches over, via a switchover operation (e.g., SSO), to the control plane of the debug network device, while the data-plane of the target network device continues to operate in a hitless or near hitless manner through updates using a control-plane and data-plane transport operation that transports updates from the control plane of the debug network device to the data plane of the target network device. Once switched over, the instrumentation (e.g., hardware or software) of the instrumented control plane or debug network device facilitates the debug, optimization, profile, and/or recovery of the physical network device, even in a live network. The control plane of the target network device may be recovered, in some embodiments, with or without reboot of the target network device. The target network device can be a standalone non-redundant physical system such as a stackable non-redundant switch. The exemplary method is not necessarily restricted to physical network device and may be performed on non-physical network device such as software-based switches.

The stack, formed by (i) a cloud server or an instrumented network equipment or server and (ii) the target network device, would operate equivalent to, and function like, a high-availability (HA) system. The instrumented network device provides additional and temporary hardware and software resources for the debugging and profiling of the physical network device (e.g., switch). Similarly, the debugging stack may be implemented in a test or laboratory environment to provide a more robust testing platform to debug or profile network equipment under design or testing. Rather than a traditional stack, the switchover operation and the control-plane and data-plane transport operation facilitate control-plane updates by the instrumented control plane of the debug network device to maintain the operation of the target network device, specifically the data plane of the target network.

The control plane of the debug network device may be instrumented or coupled to instruments on the debug network device to execute the control plane function to the data-plane of the physical network device and allow for such control plane function, as well as data plane and network functions, among others, to be evaluated by the instrumentation. The instrumentation of the control plane and, in some embodiments, using instrumented hardware can additionally provide debugging and profiling information of data plane hardware, firmware, and middleware, etc.

The debugging and profiling operation may be performed while the target network device continues to operate in a near hitless manner. The debugged or profiled data can be used to adjust the configuration of the control plane, the data plane, or the network, to address the issue in the production network. Once the debugging and/or profiling is completed, the exemplary method and system facilitate the restoration of the control plane operation to the control plane of the target network device. The debugged or profiled data can also be used to indicate or develop patches or fixes (e.g., in the switch OS or applications) to be addressed in a subsequent release of the software.

The term "switchover" as used herein (and used herein interchangeably with the term Stateful Switchover Operation or SSO) generally refers to the manual or automatic triggered switching of operation from one network device to a redundant or standby network device (e.g., due to failure of a control-plane process) and is used in the instant embodiments in similar manner for the control planes between the debug network device and the target network device. However, rather than the data plane of the target network device switching to that of the debug network device, the data plane of the target network device is maintained. To this end, during the switchover operation, the control-plane operations of the target network device is switched from the active mode to the standby mode while the control plane of the debug network device is switched from the standby mode to the active mode in which the data plane operation continues to operate at the target network device. Switchover operation, preferably, may rely on conventional and/or existing switchover mechanisms and programs to perform the various hand-shaking operations and the synchronization of control-plane states. The switchover mechanisms are coupled with other operations described herein, including virtualization mechanisms, cloud infrastructure, and/or control-plane and data-plane transport operation, among others. In some embodiments, the control plane states between the debug network device and the target network device may be synchronized using synchronization operation such as those used in Stateful Switchover (SSO) operations or those used in high availability (HA) or In-Service Software Upgrade (ISSU) technologies.

The term "control-plane data-plane transport" operation (also referred to herein as "control-plane data-plane interface transport" operation) refers to a virtual transport layer (e.g., implemented by a control-plane data-plane interface transport module described herein, also referred to herein as a "virtual PCI" or "VPCI module") that is executed in each of the target network device and the debug network device, at the respective edge of the data-plane and control-plane, to transport bus transactions, e.g., associated with control-plane updates and data-plane updates, between the data plane of the target network device to the instrumented control plane of the debug network device over a communication link, e.g., a network tunnel.

The switchover operations and control-plane and data-plane transport operations may be used in a selective and temporary manner to provide the control-plane operations to the data-plane of the target network device undergoing debugging or profiling of its control plane image and states, including network states. To this end, the target network device can maintain hitless, or near hitless, operation for its data plane even when its control plane is unavailable (e.g., when being rebooted). The term "selective" is used herein to refer to the selective use of the additional hardware (virtualized or non-virtualized) as a proxy of the control plane of the active target network device. The term 'temporary" is used herein to refer to the limited duration that the instrumented control plane is used, though, in some embodiments, it is contemplated that the exemplary systems and methods described herein can be used in an on-going manner, say, to monitor the operation of the target network device.

The term "data plane" (and data-plane) generally encompasses data-plane processor(s) and data-plane resource(s) configured to route packets from one port of the physical network device to another port. Data-plane processor (also referred to herein as data-plane devices) can include processing units involved in the switching and/or routing of packets in the physical network device such as network processors (NPUs), switching-ASICs (application-specific integrated circuit), switching FPGA (field-programmable gate array), CPLD (complex programmable logic device), and the like. Examples of data-plane resources may include, but are not limited to, MAC address table(s), FIB table(s), ACL table(s), and any other tables, register contents, content addressable memory (CAM) contents, ternary content-addressable memory (TCAM) contents, binary content-addressable memory (BCAM) contents, and memory contents (e.g., non-persistent, volatile, etc.) maintained or used by data-plane processors.

The term "control plane" (and control-plane) generally refers to a group of functions and associated control packets or traffic that involve the configuration and management, protocol state-machine, state of the switch, etc., and is usually implemented in a host processor of a switch. Examples of such traffic may include Spanning Tree Protocol (STP), Hot Standby Router Protocol (HSRP), and control packets that are destined to the network device such as a switch, or sent from the network device or application layer protocols such as Secure Shell (SSH) and Simple Network Management Protocol (SNMP) that are typically handled by the host processor. The term "host processor", as used herein, is used interchangeably with the term "host CPU" and generally refers to cores of a microprocessor or microcontroller, e.g., having RISC or CISC architecture, of a network device or equipment of interest, e.g., of a physical network device (e.g., switch), that are configured to execute computer instructions within the framework of an operating system in a networking device.

In some embodiments, the debug network device is instantiated in a cloud or remote infrastructure (e.g., cloud servers or private servers). In some embodiments, rather than cloud or remote infrastructure, the stateful switchover operation is executed with a local computing device or a second physical network device with greater computing resources as compared to the physical network device or equipped with instrumentation. In some embodiments, the local computing device or the second physical network has equivalent processing resource (or even less) as the target network device but is executing only a subset of the system image or application executing on the target network device to provide those comparatively free resource for instrumentation. Indeed, the debug network device does not require its own data-plane components (though it), and generally only need to have the computing capability to manage an instrumented control-plane for the target network device (or is equipped with hardware instrumentation). In some embodiments, the debug network device may be implemented across multiple cores or processing unit, e.g., using hyperthreading capabilities.

In some embodiments, the debug network device is configured with the equivalent computer readable instructions associated with the system image (e.g., comprising the operating system and routing application) as that of the physical network device, but instrumented via external software with debugging or profiling operation to execute concurrently with the system image or control plane application. In such embodiments, the modularity also ensures that the stateful switchover operation can be performed for any system image as generated through current development processes and workflow without need for customization or modification of the system image for it be used for this purpose. In some embodiments, the software image and control-plane can be run on top of a virtual machine (VM) or virtual host, e.g., based on virtualization or containerization technology, which are used interchangeably herein.

The term "stackable switch" (including "stackable non-redundant switch") refers to a network switch that is fully functional when operating as a standalone device, but which can also be set up to cooperatively operate together with one or more other network switches as a group in which the group can be configured to show the characteristics of a single switch. Indeed, the stack may have a common set of one or more IP addresses for remote administration of the stack as a whole. Stackable switches, and similar class device, can provide redundant operations to individual switches in switchover operations. Non-stackable switches also refer to switches configured to operate as a standalone device. Stackable and non-stackable switches may be configured with modules to perform stateful switchover operations as described herein.

In another aspect, the exemplary method (and associated system) is configured to establish a debugging cloud or remote infrastructure for a network device. The method (of the system) comprises instantiating, at a remote or cloud computing device (e.g., cloud computing platform, evaluation test platform of a target switch, custom computing server), a debug network device with an operating image (e.g., non-instrumented or instrumented production image) of a target network device (e.g., a non-redundant switch or a redundant switch), wherein the debug network device is configured, by software instructions or hardware, to execute one or more debugging processes not executing on the target network device, and wherein the target network device comprises a first control plane and data plane that is receiving and forwarding network traffic in a network; joining the debug network device and the target network device in a stack configuration to synchronize states of the first control plane of the target network device to a second control plane of the debug network device, wherein the first control plane of the target network device is initially executing in an active stacked configuration, and wherein the second control plane of the debug network device is initially executing in a standby stacked configuration; and triggering a switchover operation, wherein the switchover operation switches the first control plane of the target network device from the active stacked configuration to the standby stacked configuration and disconnects the first control plane from updating the data plane of the target network device, wherein the switchover operation switches the second control plane of the debug network device from the standby stacked configuration to the active stacked configuration, and wherein the second control plane in the active stacked configuration is connected to the data plane over a network connection and updates the data plane, wherein the one or more debugging processes are operatively executed concurrently with the second control plane of the debug network device to evaluate at least one of: i) said second control plane, ii) a hardware or firmware configuration of the target network device, and iii) the network (e.g., to profile hardware, firmware, and/or timing characteristics of a live or non-live network device, to profile protocols operations of the network or timing of network devices therein).

In some embodiments, the method include updating the data plane of the target network device via the second control plane of the debug network device using a control-plane and data-plane transport operation.

In some embodiments, one or more processes of the debug network device are used to restore the target network device from an error or invalid state associated with the data plane and/or the control plane (e.g., ASIC configuration, hardware configuration, firmware configuration, hardware-software interoperation configuration) (e.g., to recover and restore problematic switches in a live network).

In some embodiments, the one or more debugging processes are associated with at least one of an analysis tool (e.g., network, ASIC, custom, system analysis tool, e.g., Valgrind, Callgrind), a call graph analyzer, a memory analyzer, and a cache profiler.

In some embodiments, instantiating the debug network device is performed dynamically (e.g., automatically or manually to debug a problematic target network device), the method further comprising deleting the second control plane of the debug network device (e.g., at the remote or cloud computing device) following the evaluation and restoration of the target network device.

In some embodiments, the one or more debugging processes are used to profile the target network device or the network to optimize data plane configuration and/or control plane configuration of the target network device (e.g., ASIC configuration, hardware configuration, firmware configuration, hardware-software interoperation configuration).

In some embodiments, the one or more debugging processes are used to profile the target network device or the network to optimize network operation, a network policy, or a network configuration.

In some embodiments, the second control plane in the active stacked configuration provides near-hitless operation for the target network device as the second control plane of the target network device is being debugged by the one or more debug processes executing at the debug network device.

In some embodiments, the operating image comprises a non-instrumented production image.

In some embodiments, the target network device comprises a non-redundant switch.

In some embodiments, the target network device comprises a redundant switch.

In some embodiments, the joining operation is performed via stacking technologies.

In some embodiments, the switchover operation is performed via stateful switchover (SSO) operation or via that which is included in at least one of high availability (HA) operation or in-service software upgrade (ISSU) technologies.

In some embodiments, the debug network device further comprises an instrumented data plane comprising data plane components and additional instrumentation to access the data plane components, and wherein the one or more debugging processes or the additional instrumentation are configured to transmit one or more debug packets into the data plane component, and wherein the instrumentation is configured to provide logging and/or analysis of said one or more debug packets.

In some embodiments, the remote or cloud computing device comprises at least one of a cloud server, a remote server, an evaluation platform for the target network device, and a custom computing server comprising one or more debugging or evaluation sub-systems (e.g., FPGA cards, GPU cards, RTL emulators, hardware accelerators, PCIe analyzers).

In some embodiments, instantiating the debug network device comprises: retrieving the operating image of the target network device from an image server; and orchestrating a virtualized environment (e.g., container or virtualization) with an operating system and environment using the retrieved operating image (e.g., wherein the operating image can be i) the same as that of the target switch or ii) an instrumented operating system that is equivalent to the same).

In some embodiments, the method further includes establishing a tunnel connection or a direct connection between the debug network device and the target network device, wherein the tunnel connection or the direct connection is used as the network connection for the debug network device to update the data plane of the target network device.

In another aspect, a system (e.g., non-redundant switch, controller (e.g., DNAC, SDN controller, remote/cloud system, remote terminal) is disclosed comprising a host processor; and a memory having computer readable instructions, wherein execution of the computer readable instruction, cause the host processor to: instantiate, at a remote or cloud computing device (e.g., cloud computing platform, evaluation test platform of a target switch, custom computing server), a debug network device with an operating image (e.g., non-instrumented or instrumented production image) of a target network device (e.g., a non-redundant switch or a redundant switch), wherein the debug network device is configured, by software instructions or hardware, to execute one or more debugging processes not executing on the target network device, and wherein the target network device comprises a first control plane and data plane that is receiving and forwarding network traffic in a network; join the debug network device and the target network device in a stack configuration (e.g., via a stacking protocol) to synchronize states of the first control plane of the target network device to a second control plane of the debug network device, wherein the first control plane of the target network device is initially executing in an active stacked configuration, and wherein the second control plane of the debug network device is initially executing in a standby stacked configuration; and trigger a switchover operation (e.g., stateful switchover (SSO) operation), wherein the first control plane of the target network device is switched from the active stacked configuration to the standby stacked configuration and disconnected from updating the data plane of the target network device, and wherein the second control plane of the debug network device is switched from the standby stacked configuration to the active stacked configuration and connected, over a network connection, to update the data plane of the target network device, wherein the one or more debugging processes is operatively executed concurrently with the second control plane of the debug network device to evaluate at least one of: i) said second control plane (which reflects the operation of the first control plane), ii) a hardware or firmware configuration of the target network device, and iii) the network.

In some embodiments, the method includes updating the data plane of the target network device via the instrumented control plane using a control-plane and data-plane transport operation.

In some embodiments, the instructions, when executed by the host processor of the debug network device, further cause the host processor to execute the one or more debugging processes to restore the target network device from a detected error or invalidate state associated with the data plane and/or control plane of the target network device (e.g., ASIC configuration, hardware configuration, firmware configuration, hardware-software interoperation configuration) (e.g., recover and restore problematic switches detected in a live/production network).

In some embodiments, system (e.g., via a host processor of the target network device or a second processor unit or logic circuit) is configured to: read a set of bus-interconnect transactions (e.g., originating from the data plane) from a bus interconnect of the target network device and transmit the set of bus-interconnect transactions (e.g., via the control-plane and data-plane transport operation) as a set of data-plane transaction messages to the debug network device over a network interface, wherein the debug network device is configured to use the set of data-plane transaction messages to write (e.g., via the control-plane and data-plane transport operation) the set of bus-interconnect transactions to the bus interconnect or to a host processor of the debug network device to update control plane states maintained by the debug network device; and write (e.g., via the control-plane and data-plane transport operation) a second set of bus-interconnect transactions to the bus-interconnect of the target network device based on a second set of data-plane transaction messages received from the debug network device over the network interface, wherein the second set of bus-interconnect transactions updates a portion of a plurality of data-plane-associated tables of the target network device.

In another aspect, a computer-readable medium is disclosed with instructions stored thereon, wherein execution of the instructions by a processor (e.g., of a non-redundant switch, controller (e.g., DNAC), remote/cloud system, TAC remote device), cause the processor to: instantiate, at a remote or cloud computing device (e.g., cloud computing platform, evaluation test platform of a target switch, custom computing server), a debug network device with an operating image (e.g., non-instrumented or instrumented production image) of a target network device (e.g., a non-redundant switch or a redundant switch), wherein the debug network device is configured, by software instructions or hardware, to execute one or more debugging processes not executing on the target network device, and wherein the target network device comprises a first control plane and data plane that is receiving and forwarding network traffic in a network; join the debug network device and the target network device in a stack configuration (via a stacking protocol) to synchronize states of the first control plane of the target network device to a second control plane of the debug network device, wherein the first control plane of the target network device is initially executing in an active stacked configuration, and wherein the second control plane of the debug network device is initially executing in a standby stacked configuration; and trigger a switchover operation (e.g., via high availability (HA) operations such as in-service software upgrade (ISSU) operations or stateful switchover (SSO) operation) wherein the first control plane of the target network device is switched from the active stacked configuration to the standby stacked configuration and disconnected from updating the data plane of the target network device, and wherein the second control plane of the debug network device is switched from the standby stacked configuration to the active stacked configuration and connected, over a network connection, to update the data plane of the target network device, wherein the one or more debugging processes is operatively executed concurrently with the second control plane of the debug network device to evaluate at least one of: i) said second control plane (reflecting the first control plane), ii) a hardware or firmware configuration of the target network device, and iii) the network.

In yet another aspect, the exemplary system and method facilitate the profiling and debugging of a target system in a live network without affecting performance, throughput and/or functionality of the target device. It can also be done in a hit-less manner (both for the control-plane and data-plane).

In yet another aspect, the exemplary system and method enhance the debugging and profiling capability of a target system (for a short or extended time) and providing this capability on-demand by instantiating an instrumented image in the cloud or remote server.

In yet another aspect, the exemplary system and method facilitate an on-demand creation of a control-plane on a debug switch (e.g., executing in the cloud or remote server) which can be executing a different software image (instrumented or otherwise) that can control the target node without altering the expected behavior and functionality of the target node. In other words, the debug switch may execute a different software image but one that functionally equivalent and can do so dynamically and in a hit-less, or near hit-less, manner.

In yet another aspect, the exemplary system and method facilitate an on-demand creation of a data-plane and the dynamic linkage and association of that data-plane to a debugging or profiling environment that may include various hardware accelerators, emulators, data-models etc., which can be used to debug/profile the data-plane (hardware, software, and/or middleware).

In yet another aspect, the exemplary system and method facilitate a near-hitless recovery of a problematic system within a live network. The recovery could be performed without requiring a reboot and without network interruption or disruption.

In yet another aspect, the exemplary system and method facilitate operation of a debugging switch (as a shadow system) configured, in some embodiments, to run in passive mode in which the debug switch, when in standby role, receives the same set of control-plane updates, messages, and signals from the target node (which remains in active role).

In yet another aspect, the exemplary system and method is configured to employ orchestration mechanisms such as through a network controller (e.g., DNAC) or other controller or centralized control tools.

In yet another aspect, the exemplary system and method is configured to provide protection against system failures during live debug session of a target node. In such embodiment, when the active control-plane crashes, then the standby control-plane of the other device is configured to switch over without manual intervention and takes over operation of the data plane of the physical network device. The switchover is performed without any interruption to the system operations. Indeed, failover operation from an active device to a standby device can be performed via SSO mechanism, whether from the debug network device to the target network device, or vice versa.

In yet another aspect, the exemplary system and method is configured to execute a debugging switch that runs the control-plane that updates data-plane by at least one of (i) connecting to the data-plane in the target node, (ii) instantiating a separate data-plane locally using software models and/or RTL models that run on the same machine as control-plane, and (iii) implementing a hardware data-plane within the virtual debug switch itself.

Example System

FIG. 1 shows a diagram of a debug network device 102 that is created on-demand to form a stack 103 with a target network device 104 located in a network 106. The debug network device 102 executes a control plane 108 of the control plane 110 of the target network device 104 to facilitate the debug, profile, or recovery the target network device 104. The control plane 108 of the debug network device 102 may be an instrumented control plane—that is, having instrumentation code—or the debug network device 102 may include additional hardware instrumentation.

The stack 103 between the debug network device 102 and the target network device 104 is formed using a stacking mechanism or stacking protocol. Stacking operation synchronizes (e.g., via bulk synchronization and subsequent incremental synchronization) the various system state of the target network device 104 to the debug network device 102 instrumented for debugging and/or profiling. When the stack 103 is formed, the debug network device 102 is connected to the target network device over a communication link 116 (shown as network connection 116a or a direct connection 116b) established between the target network device 104, e.g., at a port of the data plane 114, and a port 118 of the debug network device 102.

In the stack 103, the target network device 104 is initially put in an active mode while the debug network device 102 is put in standby mode. In the active mode, the control plane 110 of the target network device 104 services the data plane 114 of the target network device 104. Once both target network device 104 and debug network device 102 are synchronized in states, a switchover operation is triggered to put the control plane 108 of the debug network device 102 in active mode, and it then takes over the role of servicing the data plane 114 of the target network device 104. Notably, following the switchover operation, the data plane 114 maintains operation throughout the debugging or profiling session—thus, there is no change in the network from the switchover operation from the perspective of the network and peer network devices. While in this active state, the debug network device 102 (e.g., via instrumented control plane, hardware instrumentations, or both) provides instrumentation operation to debug or profile the control plane operation, the data plane operation, and the network operation of the stack and its subcomponents.

Most manufacturers have its own proprietary switchover technologies. Examples of switchover operation include stateful switchover (SSO) operation or other such operations as employed in high availability (HA) operations or in-service software upgrade (ISSU) technologies. For the control plane 108 of the debug network device 102 to service the data plane 114 of the target network device 104, a virtual transport layer may be implemented, e.g., by a control-plane data-plane interface transport module (also referred to herein as a "virtual PCI" or "VPCI module" and shown in FIG. 1 as a "control plane interface/data plane interface transport" (CPI/DPI Transport) 120 and 122). The virtual transport layer, in some embodiments, is executed at each of the target network device 104 and in the debug network device 102, at the respective edge of the data-plane and control-plane, to transport bus transactions 126, e.g., associated with control-plane or data-plane updates, between the data plane 114 of the target network device 104 and the control plane 108 of the debug network device 102 over a communication link (116a or 116b). Further description of an example control-plane-data-plane transport module is described in U.S. patent application Ser. No. 17/29559, filed Dec. 2, 2020, which is incorporated by reference herein in its entirety.

Figure 4A:
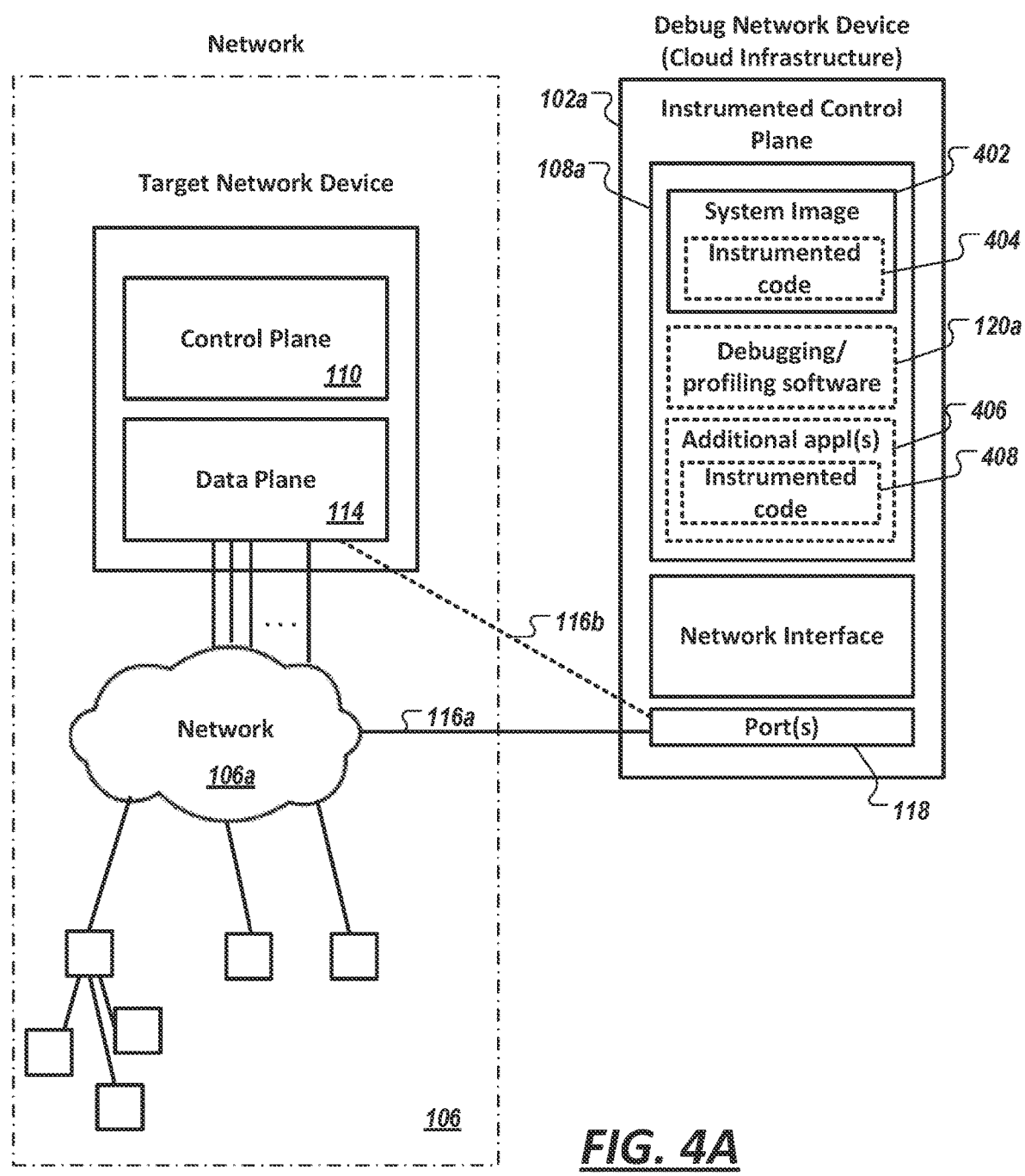
FIG. 4A is a diagram of a debug network device configured in a cloud or remote server in accordance with various illustrative embodiments.
Figure 4C:
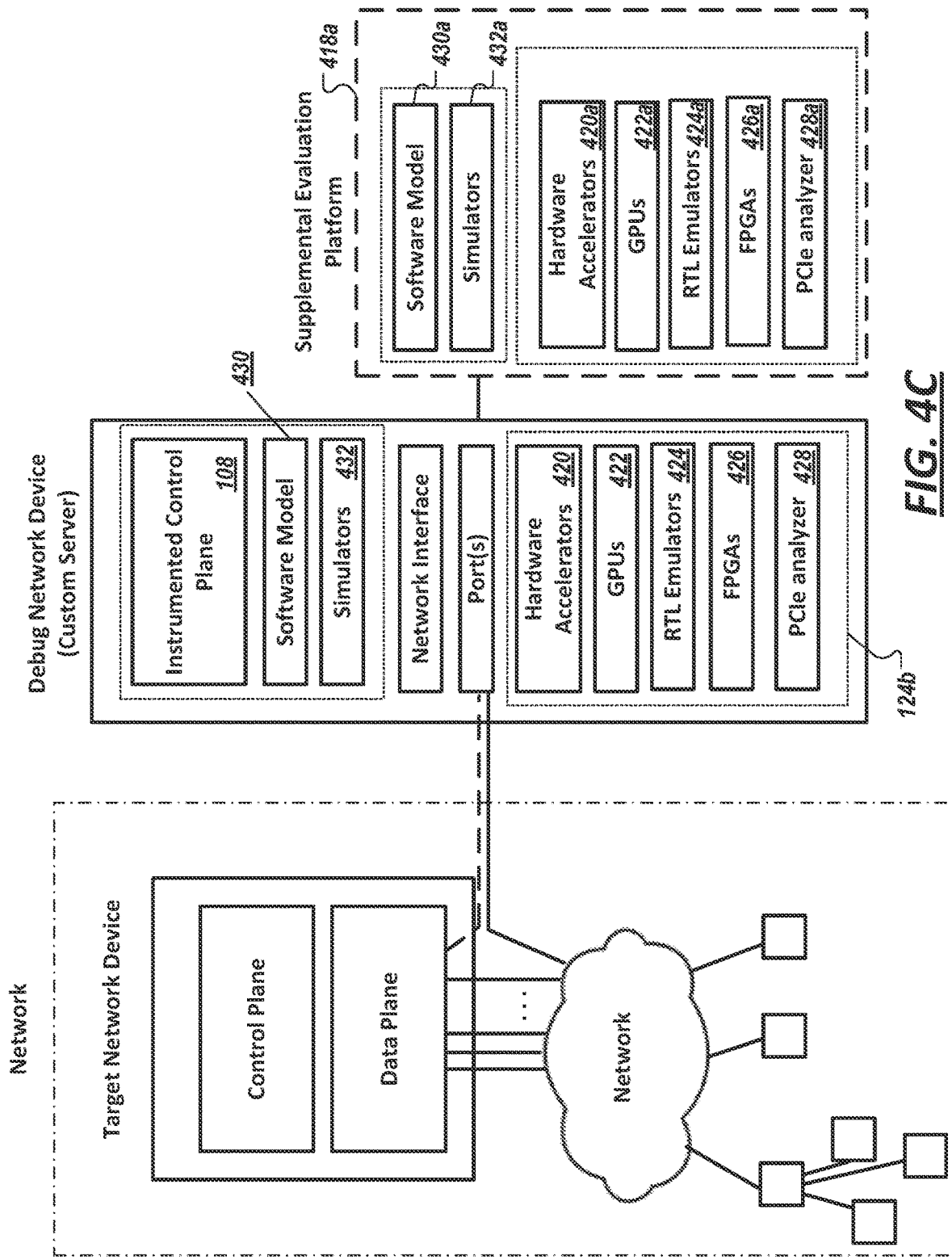
FIG. 4C is a diagram of a debug network device configured in a debugging/evaluation server in accordance with various illustrative embodiments.

The debug network device 102 can be one of a different type of machines (e.g., shown in FIGS. 4A, 4B, and 4C) that executes a debug/instrumented image corresponding to the software release running on the target network device 104 (or includes instrumentation hardware). In FIG. 4A, the debug network device 102 (shown as 102a) is a cloud or remote server. In FIG. 4B, the debug network device 102 (shown as 102b) is an evaluation switch. In FIG. 4C, the debug network device 102 (shown as 102c) is a debugging/evaluation server. In some embodiments, the debug network device 102 includes additional instrumentation or simulators 124.

The debug network device 102, generally being a high-end computing machine running an instrumented control plane of that of the target network device or instrumented with hardware for debugging/profiling, is configured to execute functionally equivalent operations of the control plane 110 of the target network device 104 while in an active mode of the stack 103, and thus enabling profiling/debug data to be collected for any environment, including in a production network. Once the debug session is completed, the debug network device 102 reverses its temporary role in stack 103 with the target network device 104, and the control plane 110 of the target network device 104 is put in the active mode in stack 103, and the debug network device 102 may then be disconnected and the instrumented control plane 108 deleted.

In some embodiments, the debug network device 102 is implemented in a data center, public cloud, or similar environment using general or custom-designed computing hardware and software. Each product line for a given device manufacturer may be instrumented using these general and custom-designed resources. Technical assistance center (TAC) staff and field engineers may use one of the nodes in an on-demand basis to debug a target network device and release when done. In other embodiments, the debug network device 102 is implemented in a standalone computing platform (e.g., another network device or a custom computing platform) that may be brought onto the site of a given network to which technical assistance center (TAC) staff and field engineers can link to the target network device through a network connection or direct connection to perform the debug/profiling operation described herein.

In some embodiments, the debug network device 102 includes instrumentation 124 comprising debugging hardware, test boards, simulators to operate in conjunction with the instrumented control plane 108. Instrumentation 124 may include commercially off-the-shelf or custom-built debugging hardware, test boards, simulators, and software.

Method to Establish a Debug Network Device

Figure 2:
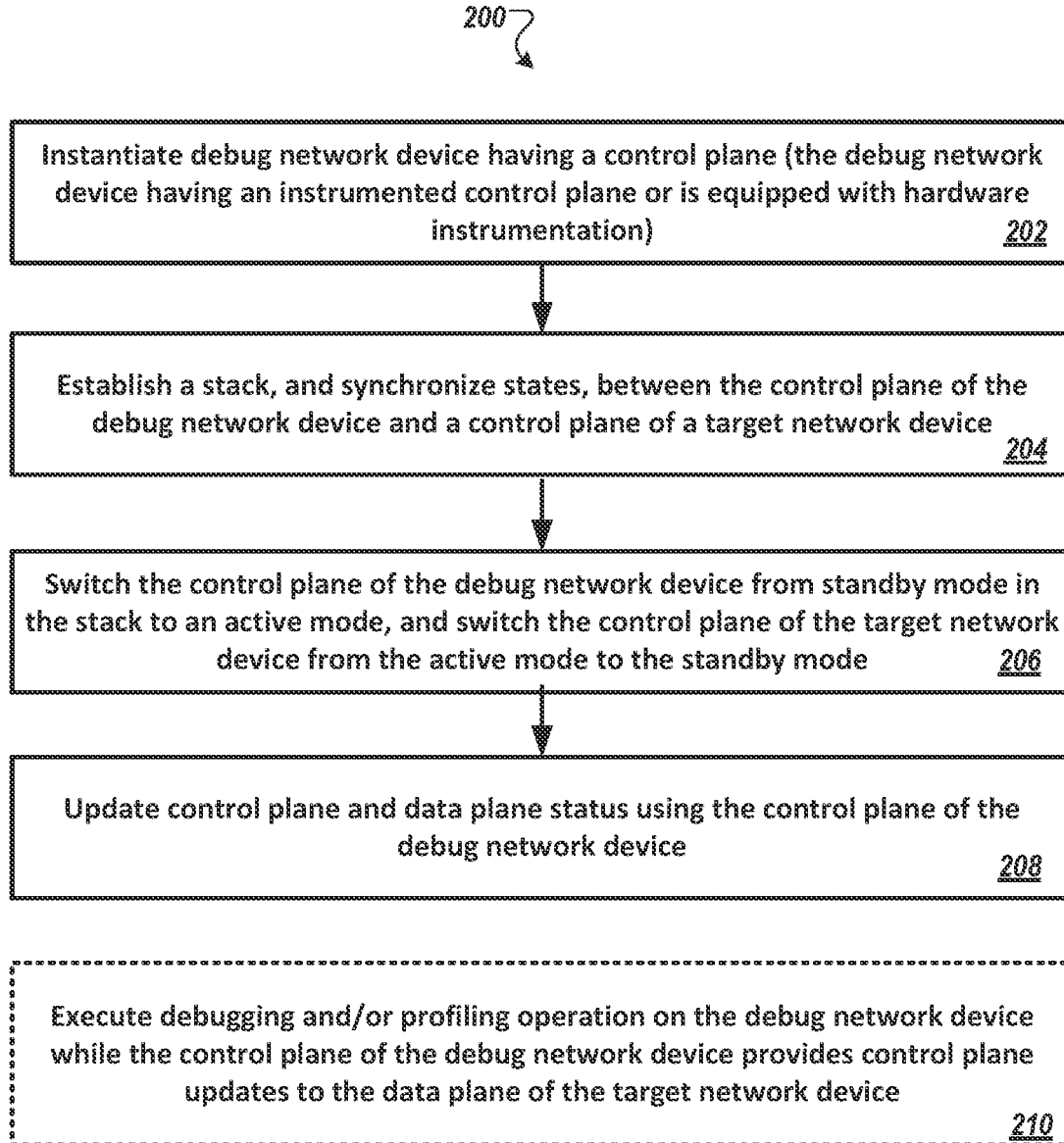
FIG. 2 is diagram showing an exemplary method to establish a debug network device in accordance with an illustrative embodiment.

FIG. 2 is diagram showing an exemplary method 200 to establish a debug network device 102 in accordance with an illustrative embodiment. The debug network device 102 is first instantiated (202) with control plane 108. In some embodiments, instantiation operation entails loading, or directing the loading of, a system image of the target network device onto the debug network device. The loaded system image may be instrumented, or instrumentation software may be executed, in an application space of the debug network device. In some embodiments, the debug network device 102 include debugging or profiling hardware, which may be instantiated during process 202.

The method 200 then includes establishing (204) a stack 103 between the debug network device 102 and the target network device 104. The control plane 110 of the target network device is initially designated to be in active mode of the stack 103, and the control plane 108 of the debug network device is in the standby mode. A connection 116, in some embodiments, is established (204) between the debug network device 102 and the target network device 104. The connection 116 (shown as 116a), in some embodiments, is a network tunnel established over the network 106 (shown as 106a) between the debug network device 102 and the target network device 104. In other embodiments, the connection 116 (shown as 116b) is established as a direct communication link between the debug network device 102 and the target network device 104. Direct communication link may include, but not limited to, direct serial communication link such as ethernet cross-over cable, ethernet, USB, FireWire, SVL link, Sonet/SDH, Frame-relay, X.25, T1/E1, and the like, that can sufficiently provide control plane and data plane updates. Direct communication link can also refer to wireless links such as WiFi (e.g., 802.11), LTE 4G/5G, WiMAX, and the like.

After the formation of the stack 103, bulk synchronization, and/or incremental synchronization, of the stack protocol is performed to synchronize the states (e.g., control plane states) of the target network device 104 (which is in active mode) with the debug network device 102 (which is in standby mode). Once the states of both the target network device 104 and the debug network device 102 are synchronized, the method 200 includes switching (206), in a switchover operation, the instrumented control plane 108 of the debug network device 102 from standby mode in the stack to an active mode, and switching the control plane of the target network from the active mode to the standby mode. During and after the switchover operation (206), the data plane operation (shown via data-plane 114) of the target network device 104 is maintained and the target network device continues to actively route any traffic that it receives to the appropriate network node. Concurrent with the continued data plane operation (by data plane 114) of the target network device 104, the control plane 108 of the debug network device 102, while in the active mode, takes over as the control plane operation of target network device 104 and provides or services, any control plane updates (as well as management plane updates) to the data plane 114, e.g., via a virtual transport operation over the connection 116.

At this point, the instrumented control plane 108 is established and operating in active mode to control the target network device 104. The method 200 may then include executing (210) debugging and/or profiling operations at the instrumented control plane 108 of the debug network device 102. While the debugging or profiling operation are ongoing, as noted above, the control plane 108 of the debug network device 102 continues to provide control plane updates to the data plane 114 of the target network device 104. In some embodiments, the instrumented control plane 108 may generate a notification to a user that the control plane 108 of the debug network device is in a debug-ready state. In some embodiments, the notification may be a message in a command line interface or a status window.

During step 210, the debug network device 102 may be triggered to execute a profiler (e.g., run-time profiler or debuggers) such as cache simulation, branch predictors, call-graph analyzers, Valgrind, etc. The control plane 108 (instrumented) may generate trace-logs or execute memory analysis tools such as memory leak detectors, memory profilers, dynamic analysis tools, memcheck, and the like. The debugging operation may include adding instructions or commands to the execution of the system image or control plane application. The debugging operation may be performed over the course of a few hours and then active mode is then switched over to the control plane 110 of the target network device 104 at the end of the debugging session. In some embodiments, the debugging operation is maintained for an extended period of time (e.g., left running over night and/or over the course of a few days or even for weeks, e.g., for profiling). Concurrent with, prior to, or after the debugging operation 210, the control plane 108 of the debug network device 102 is configured to update (208) the control plane or system status via control-plane data-plane interface transport module.

Indeed, the debug network device 102 may take over the control plane operation of the target network device 104 in a hitless or near-hitless manner—that is, without disruption to its switching and protocol operations.

Method to Debug/Profile Using the Debug Network Device

Figure 3A:
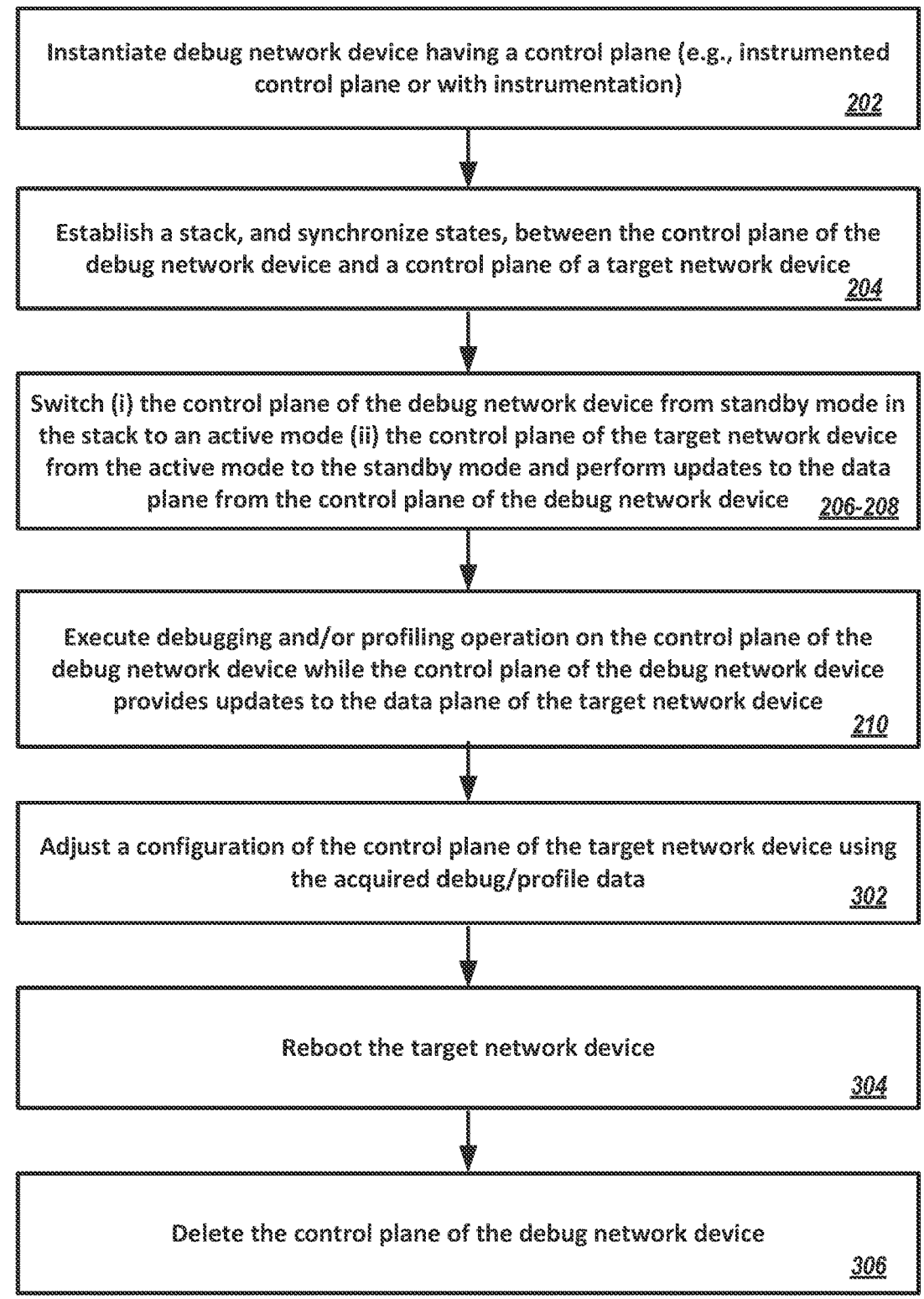
FIGS. 3A, 3B, and 3C each shows a diagram illustrating an exemplary method to perform debugging or profiling operations using the debug network device in accordance with various illustrative embodiments.
Figure 3B:
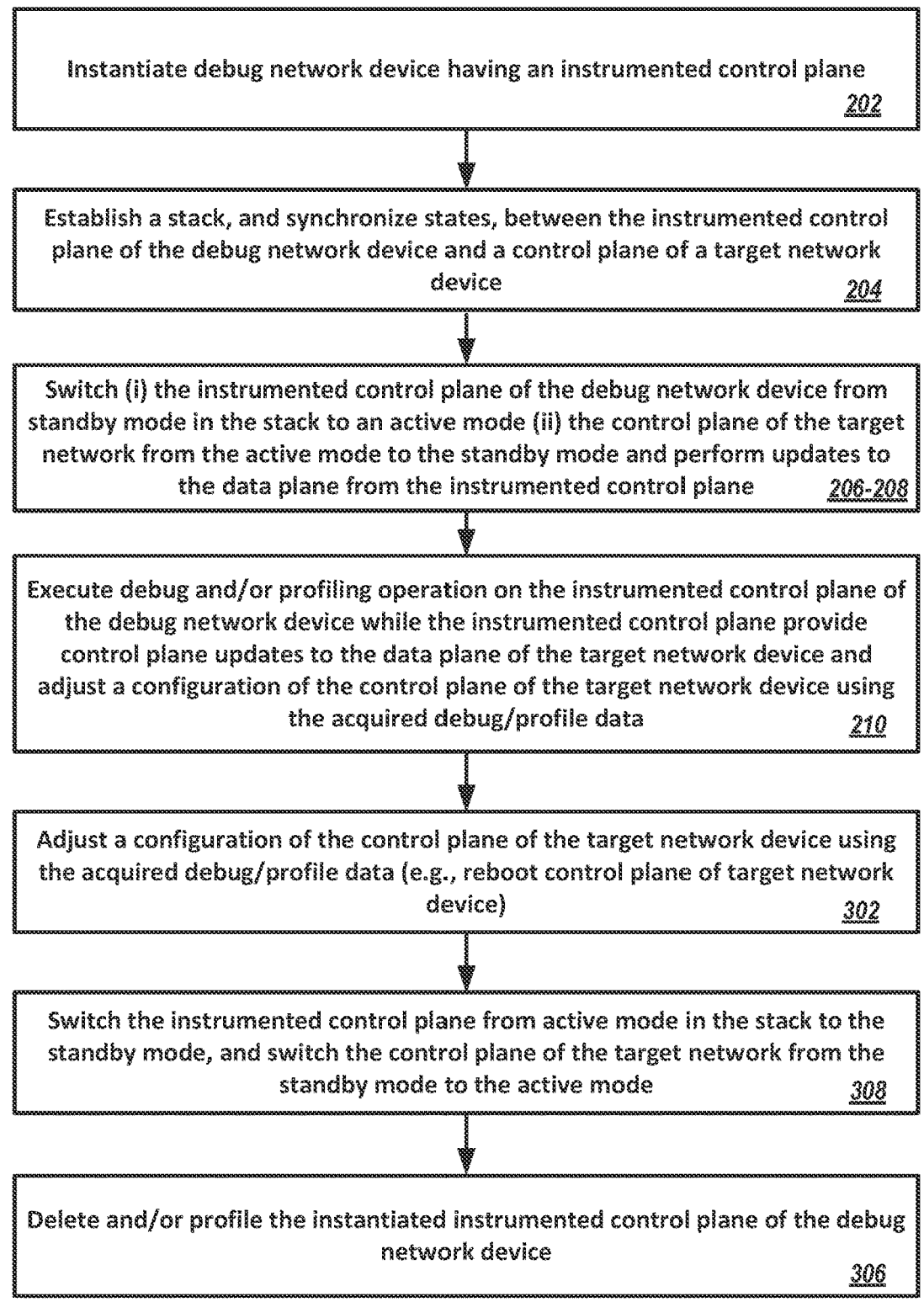
Figure 3C:
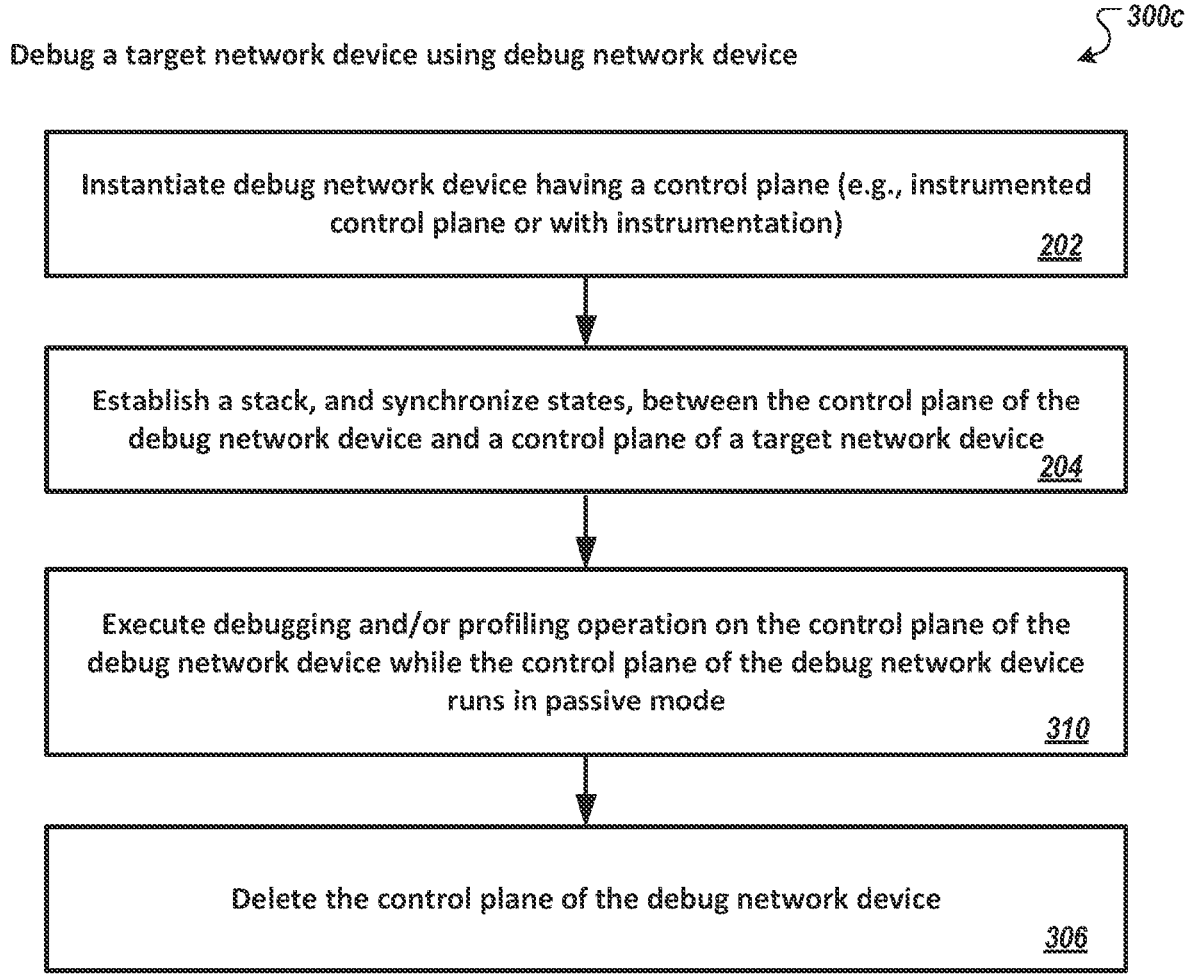

FIGS. 3A, 3B, and 3C each shows a diagram illustrating an exemplary method 300 (shown as 300a, 300b, and 300c respectively) to perform debugging or profiling operations using the debug network device 102 in accordance with various illustrative embodiments. FIGS. 3A and 3C each shows an example of operation to establish and debug the target network device 104 using the debug network device 102 in accordance with an illustrative embodiment. FIG. 3B shows another debugging operation in which the target network device 104 may be restored without network interruption or disruption in accordance with an illustrative embodiment. Notably, FIG. 3A provides an example operation that illustrates the benefit of this technology in facilitating the collection and/or profiling of control plane, data plane, and network operations of a target network device in its live network device. FIG. 3B provides for the same (i.e., debugging capabilities) and further illustrates that the collection and/or profiling can be disruption-less to the target network device via use a second switchover operation to restore the control plane of the target network device as the active device to provide. FIG. 3C provides another debugging operation, though more limited, using passive mode.

Debugging Operation Example #1. In FIGS. 3A and 3B, the method 300a, 300b, 300c each includes establishing and executing (shown via 202-208) a debug network device 102 having a control plane 108 (e.g., an instrumented control plane or the debug network device is equipped with instrumentation hardware) in active mode to the target network device 104 and is performing a set of debugging operations, as for example described in relation to FIG. 2.

In FIG. 3A, following the debug network device 102 being initialized and controlling the data plane 114 of the target network device 104 (steps 202-208) and the debugging operation (step 210) being performed, the method 300a further includes adjusting (302) a configuration of the control plane of the target network device using the acquired debug/profile data. The adjustment (302) may be to a configuration of the control plane configuration, the data plane, a network setting, or any of the configurable or reprogrammable features of the target network device, including ASICS and various hardware of the target network device 104. In some embodiments, the adjustment (302) includes adjusting the designated boot-up system image of the target network device 104 as an upgrade to the control plane 108.

The method 300a then includes rebooting (304) the control plane 110 of the target network device 104, and the control plane 110 booting up without the stack configuration between the target network device 104 and the debug network device 102. Upon being loaded, the target network device 104 resumes its operation with the bug or misconfiguration issue addressed. Additional debugging and profiling operations may be repeated until a desired result has been achieved.

Following or concurrent with the reboot operation (304), the control plane 108 of the debug network device 102 may be disabled and, in some instances, deleted (306). During this closing process (306), in some embodiments, the control plane 108 of the debug network device 102 and/or its configurations may be stored for later retrieval, e.g., for analysis or usage.

Indeed, method 300a may be performed while the target network device 104 continues to operate in a live environment with some, though minimal disruption to the network 106 (i.e., the time to reboot the target network device). The methods 200, 300 may be similarly performed on a target network device 104 executing in a controlled testing or laboratory environment (e.g., during the design and/or testing of a network device).

Debugging Operation Example #2—recover problematic switches with effectively no service impact. In some embodiments, to recover a network device with minimal service impact, the control plane 110 of the target network device 104 may be directed to resume active mode, and recovery can occur (with or without a reboot) without any, or with even less, service disruptions by the target network device 104 to the network 106.

In FIG. 3B, following an adjustment (step 302) of the configuration of the control plane 110 of the target network device 104, for example, as described in relation to FIG. 3A, the method 300b further includes switching 308, via a second switchover operation, the instrumented control plane 108 from the active mode in the stack to the standby mode, and switching the control plane of the target network from the standby mode to the active mode. Indeed, the control plane operation is now restored on the target network device 104 without any network disruption.

Prior to the second switchover operation (step 308), the control plane 110 of the target network device 104 may be re-booted and reconnected to the stack, still in the standby mode. Then, the second switchover operation (308) can occur to put the control plane 110 of the target network device 104 in the active mode. As discussed above, the adjustment operation 302 may include an adjustment to a configuration of the control plane configuration, the data plane, a network setting, or any of the configurable or reprogrammable features of the target network device including designating a new boot-up system image for an upgrade to the control plane 108 of the target network device 104.

Similar to FIG. 3A, following the second switchover, the instrumented control plane 108 may be disabled and, in some instances, deleted (306). In some embodiments, the instrumented control plane 108 and/or is configurations may be stored for later retrieval, e.g., for analysis or usage.

Indeed, if a non-redundant switch in a customer network is affected with uncorrectable/unrecoverable issue (for e.g., partial traffic loss, uncorrectable memory error, hardware issues, control-plane/data-plane inconsistencies etc.), and reloading is the only option, then the exemplary methods can be used to recover the target switch for certain cases with minimal impact. In some embodiments, the debug network device may be spawned in the cloud, which then forms a stack with the target network device (problematic switch) and then takes up "active" role while the target switch can go through reboot. The debug switch may collect additional data from the data-plane of the target network device for analysis before it is reset. In some embodiments, this operation provides near-hitless control-plane functionality and data-plane functionality. In other embodiments, this operation provides near-hitless control plane functionality and a short disruption (e.g., a few seconds or even sub-seconds) of data-plane functionality.

The exemplary workflow (e.g., 300a, 300b, 300c, etc.), and others described herein, may be integrated with a network controller (e.g., DNAC) or other controller or centralized control tools, which may be used to coordinate or trigger the orchestration, switchover to configure the debug network device. In some embodiments. The trigger may be automatic based on pre-defined rules or polices.

In some embodiments, while a live-debug session is on-going, and engineers/TAC perform an intrusive debug operation which crashes the debug network device, the same switchover mechanism (e.g., SSO) can automatically trigger a switchover of the control plane 110 to the active mode to resume normal operation to maintain operation of the stack in an uninterrupted manner.

Debugging Operation Example #3—Passive Mode Debugging. In some embodiments, a debug network device is instantiated and configured to run in passive mode to the control plane 110 of the target network device 104. In passive mode, the control plane 108 of the debug network device 102 is updated by state changes that occur at the control plane 110 of the target network device 104. To this end, the debug network device 102 with its additional instrumentation (hardware and software) can still profile state changes of the control plane of the target network device.

In FIG. 3C, the debug network device is instantiated (202) and a stack is established (204) between the target network device 104 and the debug network device 102. However, unlike FIGS. 3A and 3B, there is no switchover operation. Rather, the control plane 108 of the debug network device 102 operates in passive mode and receive updates from the control plane 110 of the target network device 104, which maintains control operation of the data plane 114.

In some embodiments, hardware simulations (e.g., VHDL simulations of the ASIC) may be executed on the debug network device.

Example Debug Network Device

FIGS. 4A, 4B, and 4C each shows an example debug network device 102 (shown as 102a, 102b, and 102c, respectively) in accordance with an illustrative embodiment.

Cloud infrastructure. FIG. 4A shows the debug network device 102a implemented in a remote or cloud computing device (e.g., cloud computing platform). In some embodiments, the remote or cloud computing device may be implemented in Amazon AWS, Microsoft Azure, Cisco Cloud Solutions, Google GCP, or any public/private cloud or local/remote network. In FIG. 4A, the remote or cloud computing device 102a is preferably a modular stripped-down high-end general-purpose server computer. In some embodiments, the debug network device 102a is implemented on a high-end general-purpose computer. The computer may host powerful CPUs (e.g., 64/128/256-cores) with hundreds of GiB of RAM and capable of running custom software models, RTL emulators, simulators etc. for corresponding functionality from the network switches.

The exemplary debug network device is generally configured with more computation power than the target network device, e.g., any one of greater number of cores, greater number of memory resources, faster clock speed, larger caches, etc. With scalable cloud system, the resources can be pooled from multiple distributed computing resources.

In FIG. 4A, the debug network device 102a executes an instrumented control plane 108 (shown as 108a). Within the instrumented control plane 108a, the debug network device 102a executes a system image 402 and instrumented code 404. The instrumented code 404 within the instrumented system image 402 may be used to generate trace-logs and may include command-line function to evaluate various subset of modules of the system image or control plane applications. In some embodiments, the instrumented control plane 108a includes application code 406, that executes within the operating system of the network device, and that may include instrumented code 408. In yet other embodiments, the instrumented control plane 108a includes debugging or profiling software 410 that are installed into its application space.

In some embodiments, the debug network device 102a is implemented in a data center, public cloud, private cloud, or similar environment using general or custom-designed computing hardware and software. Each product line for a given network equipment manufacturer may be instrumented using these general and custom-designed resources.

Switch Platform. FIG. 4B shows the debug network device 102b implemented in an evaluation/validation platform. The evaluation/validation platform 102b may implement a debug switch that is functionally equivalent or similar to the target network device 104.

The debug network device 102b may include instrumented control plane 108. In some embodiments, the debug network device 102b may include an instrumented data plane 414. Generally, ASIC blocks and embedded microcontrollers under design may include additional I/O debugging pins, which are purposely not exposed or included in the production switches for security concerns but are now exposed or included for debugging. The debug network device 102b may be a custom development platform that are typically used during the development of network equipment and can be configured, to enable these I/O debugging pins in the ASIC blocks and embedded microcontrollers of the debug network device 102b. Instrumented data plane 414, in some embodiments, includes data plane of the debug network device 102b that is instrumented by external test equipment.

The evaluation platform 102b may include instrumentation 124 comprising debugging hardware, line-cards, test boards, hardware and/or software simulators, hardware accelerators, graphic processor units (GPUs), RTL simulators, PCIe/AXI or various analyzers that can be installed into the debug network device 102b (see also FIG. 4C) to operate in conjunction with the instrumented control plane 108. The instrumentation 124 may be connected to a separate debugging terminal 416.

In addition, instrumentation hardware and systems 418 (e.g., oscilloscopes, logic analyzers, EMI evaluating equipment, network test equipment, etc.), as external test equipment, may be used to evaluate the instrumented control 108 or the instrumented data plane 414.

The evaluation platform 102b may be used during hardware boot-up and have additional functionality to aid in debugging. In some embodiments, the evaluation platform 102b includes additional debugging pins in the circuit boards and modules of the switch.

In some embodiments, for debugging of data plane issues, the exemplary method and system may be configured in which the target network device is configured for selective traffic mirroring operation. For most use cases, a small number of packets may be duplicated to the data plane for debug. The debug network device can pass these packets through an instrumented data plane for detailed analysis. For example, ASIC emulation model in software may be implemented as a data plane implementation. The model may be used to provide for detailed logging and analysis. Current troubleshooting session often are limited to offline debug/analysis by collecting, e.g., over multiple iterations, ASIC states from a target network device (e.g., switch) and replaying it in a lab with the necessary packets. The instrumented control plane facilitates real-time analysis of traffic from a live system.

Custom Computing Server. FIG. 4C shows the debug network device 102 (shown as 102c) implemented in a custom computing server designed for a specific product line of a given network device and tightly integrated with hardware accelerators, FPGAs, hardware emulators, etc.

In some embodiments, and as shown in FIG. 4C, the debug network device 102c include instrumentation in the form of development tools such as software models 402 or simulation models 404.

Data-plane simulation models 430 (e.g., of the operating system of the ASIC VTP) may be implemented in the instrumented control plane 108. In such examples, traffic can be steered (e.g., through a tunnel) and inputted to the network ports of the data-plane simulation model. This debugging operation offer potentially enhanced debugging of the data-plane traffic through elaborate event logs and trace messages from the RTL model.

In addition, as described in relation in FIG. 4B and now shown in FIG. 4C, the debug network device 102c may also include various hardware development and debugging tools such as hardware accelerators 420, graphic processor units (GPUs) 422, RTL simulators 424 (e.g., register transfer level (RTL) description, Verilog or HDL simulators), and PCIe analyzers 428. The instrumentation 124 (shown as 124b) may be connected to a separate debugging terminal 416.

In addition, as described in relation in FIG. 4B and now shown in FIG. 4C, the instrumentation hardware and systems 418 (shown as 418a) may include oscilloscopes, logic analyzers, EMI evaluating equipment, network test equipment, etc., as external test equipment, that may be used to evaluate the instrumented control 108 (e.g., 108a) (or the instrumented data plane 414 as shown in FIG. 4B). The instrumentation hardware and systems may also include various hardware development and debugging tools such as hardware accelerators 420 (shown as 420a), graphic processor units (GPUs) 422 (shown as 422a), RTL simulators 424 (e.g., register transfer level (RTL) description, Verilog or HDL simulators) (shown as 424a), and PCIe analyzers 428 (shown as 428a).

Control-Plane Data-plane Transport Module

Figure 5:
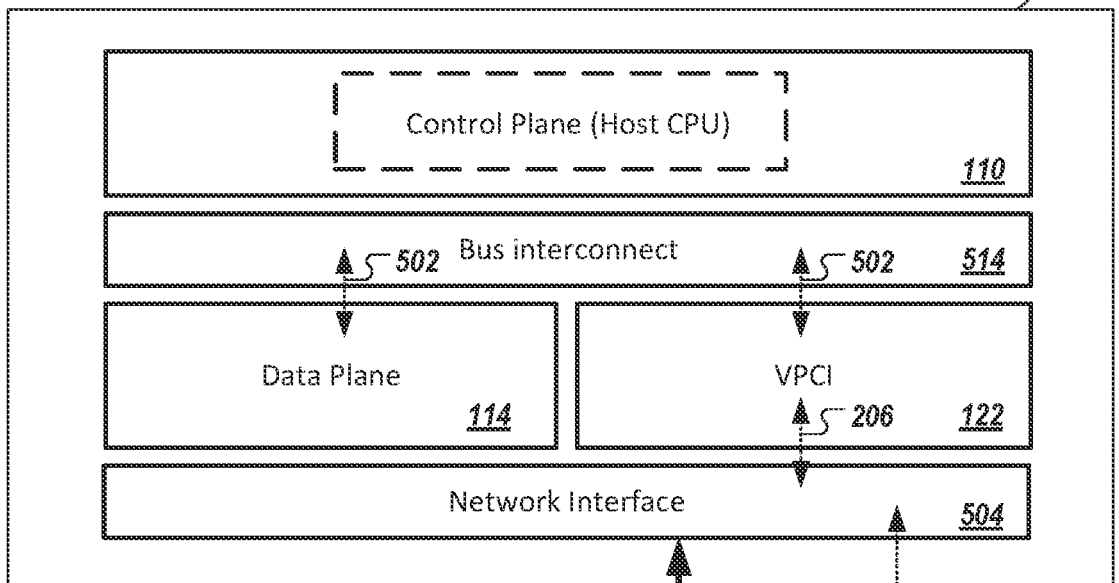
FIG. 5 shows an example method of operation of the control-plane data-plane transport module that is used by the instrumented control plane to update, and/or receive updates from, the data plane of a target network device in accordance with various illustrative embodiments.
Figure 5:
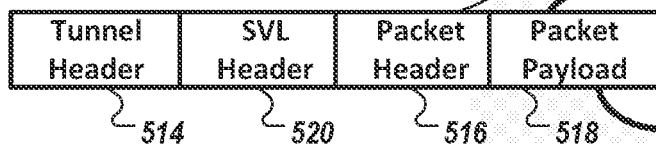
Figure 5:
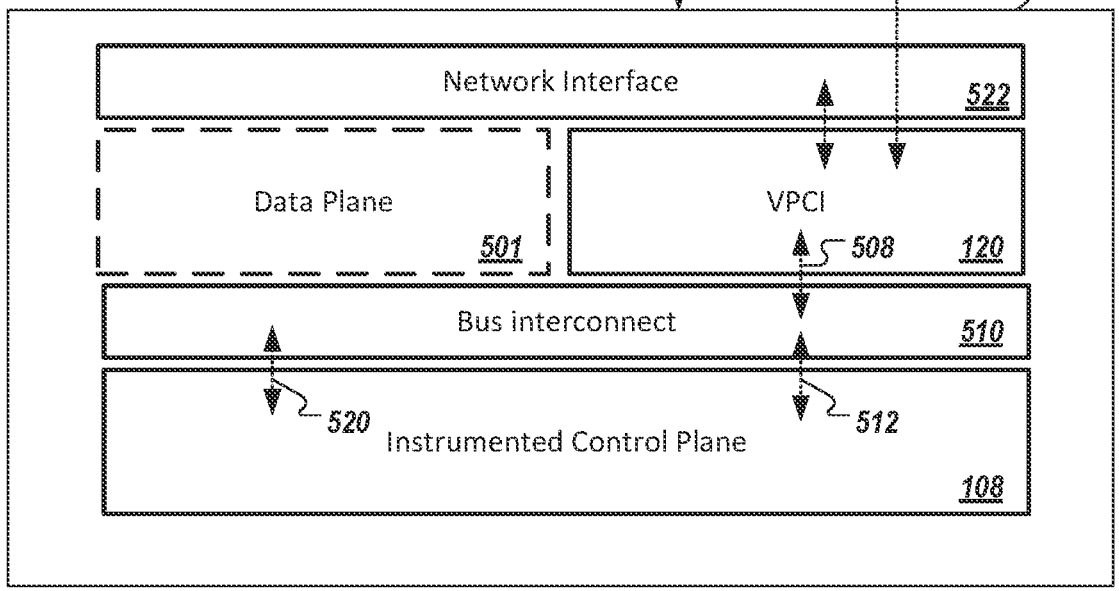

FIG. 5 shows an example method of operation of the control-plane data-plane transport module 120, 122 (shown as "VPCI" 120, 122) that is used by the instrumented control plane to update, and/or receive updates from, the data plane 114 of a target network device 104 in accordance with various illustrative embodiments. In FIG. 5, the target network device 104 and the debug network device 102 each includes a control-plane-data-plane interface transport module 120, 122 that each provides logical device-access operations such as bus transactions, or a logical equivalent thereof. The control-plane-data-plane interface transport modules 120, 122 are each configured to transport bus transactions between the target network device 104 (specifically, the data plane 114) and the debug network device 102 (specifically, the instrumented control plane 108).

The instrumented control plane 108 of the debug network device 102 makes control-plane updates received at the data plane 114 of the target network device 104 using the control-plane-data-plane transport modules 120, 122. Data plane updates determined at the instrumented control plane 108 are also pushed to the data plane 114 of the target network device 104 using the control-plane-data-plane interface transport modules 120, 122. As shown in FIG. 5, the debug network device 102 may or may not include its own data plane 501.

Example Control-plane updates. Configuration of the data-plane 114 of the target device 104 are initiated, in some embodiments, by the control-plane 110 of the debug network device 102. Upon a control plane update packet being received at the target network device, the control-plane data-plane transport module (shown as VPCI) 122 is configured to implement read and write transactions. That is, it can read write-bus transactions 502 (e.g., control-plane updates) from the data plane 114 of the target network device 104 (intended for its control-plane 110) and provides the write transaction 502 to the network interface 504, which transmits that transaction 502 as a message 506 over the communication link 116 (shown in FIG. 1 as 116a or 116b)

to the debug network device 102. The debug network device 102 receives the messages 506 and writes, via a corresponding control-plane-data-plane interface transport module 120 (shown as "VPCI" 120), bus transactions 508 to a bus interconnect 510, or a logical equivalent of, of the debug network device 102 to write 512 to its control plane 108. It is at this point that the control plane for the stack has been updated. An example control plane update is the "punt" packet of an OSPF update. A bus interconnect (e.g., 510, 514) is a bus interface such as a PCI, PCIe (PCI-express) bus, AXI, SPI (system packet interface), PCI-X, PCI-express 16x, PCI-express 1x, PCIe 4.0, PCIe 5.0, PCIe 6.0, or the like. Similarly, the control-plane data-plane transport module 120 can provide data plane updates (e.g., as a result of a control plane update) to the data plane 114 of the target network device 104 by taking the update and sending it as a message 506 over the communication link 116 to the target network device 104. The target network device 104 receives the messages 506 and writes, via a corresponding control-plane-data-plane interface transport module 122 to the bus interconnect 502, or a logical equivalent of, of the target network device 104 to write to the data plane 114.

Example Data plane updates. Similarly, the control-plane data-plane interface transport module 120 of the debug network device 102 is configured to take write bus transactions 520, or equivalents thereof, from the instrumented control plane 108. The bus transaction 520, or its equivalent, is provided to the network interface 522 of the debug network device 102 and is transmitted as a message (similar to 506) over the communication link 116 to the target network device 104, which reads the message. The control-plane data-plane interface transport module 122 of the target network device 104 uses the message (similar to 506) to write bus transactions (similar to 502) to the bus interconnect 514 to write to the data plane 114.

The messages 506 (for a control plane or data plane update) can be in any format or protocol. In some embodiments, the bus transaction is encapsulated as a payload in an encapsulated packet, which serves as the message. In some embodiments, multiple bus transactions may be encapsulated as the payload in single encapsulated packet. The message 506, in some embodiments, includes a tunnel header 514, packet header 516, and packet payload 518. In some embodiments, the message 506 is a transmitted using existing stack-over operations which may encapsulate the packet header and packet payload with an SVL header 520 to which the resulting packet is encapsulated a tunnel header associated with the connection. The messages 506 can nevertheless be in any format or protocol. In some embodiments, the bus transaction is encapsulated as a payload in an encapsulated packet, which serves as the message. In some embodiments, multiple bus transactions may be encapsulated as the payload in single encapsulated packet.

In some embodiments, the control-plane-data-plane transport module 122 is implemented as an integrated component of the target network device 104. In other embodiments, the control-plane-data-plane interface transport module 122 is implemented as a core or logic circuit in an ASIC of the target network device 104. In yet other embodiments, the control-plane-data-plane interface transport module 122 is implemented in a core or logic circuit of an auxiliary card of the target network device. Further description of the control-plane-data-plane transport module is described in U.S. patent application Ser. No. 17/29559, filed Dec. 2, 2020, which is incorporated by reference herein in its entirety.

Figure 6:
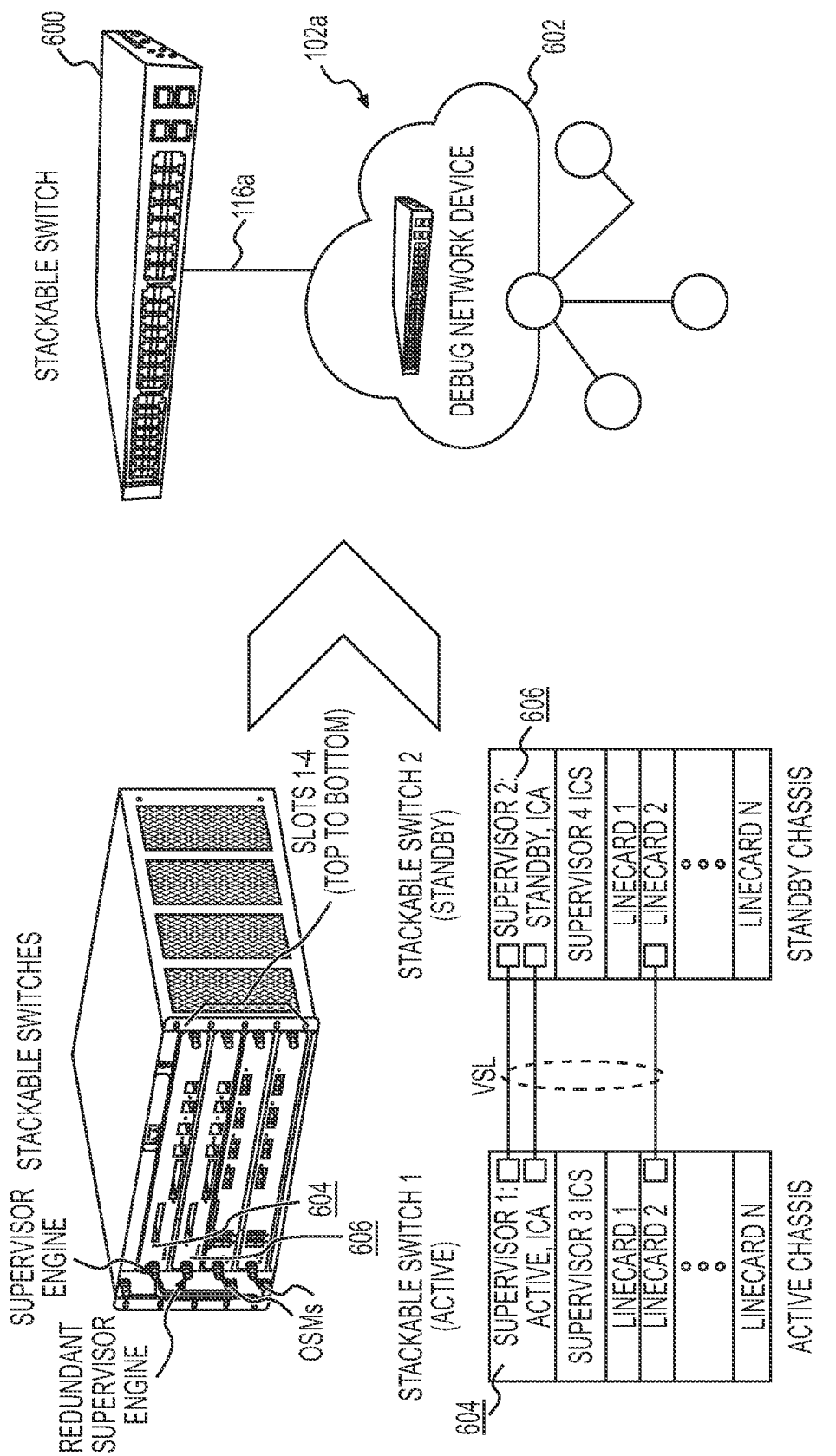
FIG. 6 shows a method of establishing a debug network device using the stateful switchover operation in accordance with an illustrative embodiment.

Example Debug Network Device Using Stacking Protocols, Stateful Switch-Over, and Virtual Transport Layer FIG. 6 illustrates the usage of stacking protocols and stateful switchover operation to establish a debug network device 102 in accordance with an illustrative embodiment. Stacking operation and stateful switchover operation are complementary concepts, and are not substitutable. Generally, stateful switchover operation does not require a stack (e.g., stateful switchover operation can be performed in any system with multiple control planes, for example, a modular system with dual supervisors), though it is used herein to establish the debug network device 102 as the active device to control the data plane of the target network device 104.

Stacking is generally a process by which the members of a stack form a single logical entity managed by one of these entities (called the "active"). The other stack members are the "standby" and if more than two, and the remaining are simply "members". Stacks are form by a stack protocol. Most switch equipment manufacturers have its own stacking protocol, any of which may be used with the method described herein. Examples of stacking mechanisms include stack cables (e.g., backside stacking) mechanisms or network-based stacking mechanism such stack-wise virtual link (SVL). In FIG. 6, the exemplary system comprises a remote server or cloud server 602 that is orchestrated (or a debugging machine is provided as described herein) and a secure tunnel 116a is then established between the standby remote/cloud server 102a and the active target network device 104 to form a stack. Once a stacking configuration is formed between a target network device and a debug network device, bulk synchronization operations (e.g., of the stacking protocol) may be initiated, and the synchronization continues until the configurations of the active target network device are synchronized with the standby debug network device. Incremental synchronization may be then performed for any subsequent updates. Virtual transport layer, e.g., control-plane data-plane transport operation, takes over updates after switchover operation occurs and is generally a separate operation from that of the synchronization of the stacking protocol.

Switchover operation such as stateful switchover operation (SSO) is the mechanism by which the "standby" becomes the "active", either because of a failure of the active member, or because it is operationally forced into that status. Stateful switchover operation is generally used (as shown in FIG. 6 left side) to provide fault resistance capabilities for an active/primary stackable switch/chassis by employing a redundant supervisor engine (shown as 606), on a same or different chassis, having similar or same capabilities to the primary supervisory engine and hardware (shown as 604), to take over network operation of the primary supervisor engine (604) when the primary supervisory engine (604) fails or becomes unavailable. Here, the exemplary system and method use stateful switchover operations to put the control plane of the debug network device in active mode and in control of the data plane of the target network device while putting the control plane of the target network device in standby. Stateful switchover operation relies on redundant hardware (e.g., 606) in a standby network device to take over operation of the active network device (e.g., 604) to continue to forward network traffic with no loss of sessions when the control plane of the active network device becomes unavailable. The redundant hardware as the debug network device 102a is used to generate an instrumented control plane 108 to debug, optimize, profile, or recover a network device in a live network.

Most switch equipment manufacturers have its own switchover operations. Examples of switchover operation include SSO operations or similar operations as used in high availability (HA) or ISSU technologies. In virtualized high availability operation, like high availability operation, the network devices are joined by a configurable control link and data synchronization link. The control link is used to communicate the status of the network devices. The data synchronization link is used to transfer stateful information to synchronize the stateful database for the calls and media flows. Each pair of redundant interfaces may be configured with the same unique ID number.

Virtual transport layer, e.g., control-plane-data-plane transport module (e.g., 120 and 122, respectively) in each of the network devices (e.g., 102, 104), provides bus-transaction transport operations of control plane and data plane updates between the active target network device (e.g., 104) and the virtualized standby debug network device (e.g., 102a). When the control plane 108 of the debug network device 102 is in the active mode, the control-plane data-plane transport operation provides any control plane and data plane updates to the data plane 110 and the instrumented control plane 108.

That is, the data-plane-control-plane transport modules 120, 122 implements a logical data-plane interface (e.g., for PCI (vPCI), AXI (vAXI), or other bus interconnects) that (i) provides, or can interface to, the device access layer and (ii) provides communication between the data-plane drivers running on the instrumented control plane 108 of the debug network device 102 and the data-plane 110 of the target network device 104. Device-access layer is the interface directly above hardware. This is the lowest layer in the ASIC/hardware driver. The data-plane drivers in the debug network device 102 (e.g., 102a) may be mapped to the underlying data-plane device (or the logical data-plane interface endpoint) and the control plane 108 of the debug network device 102 can view and access the entire memory map of the data-plane device (e.g., 114). The data-plane-control-plane transport modules 120, 122 may implement a tunnel (or a socket) using technologies such as GRE, VxLAN, or similar mechanisms. The data-plane-control-plane transport modules 120, 122 may encapsulate a given bus transactions to send through a given tunnel. Raw register/memory access operations are then sent and received over the data-plane-control-plane transport modules 120, 122. Further description of virtual transport layer operation is present in U.S. patent application Ser. No. 17/29559, filed Dec. 2, 2020, which is incorporated by reference herein in its entirety.

Example Debug Network Device Using a Virtualized Standby Switch

Figure 7:
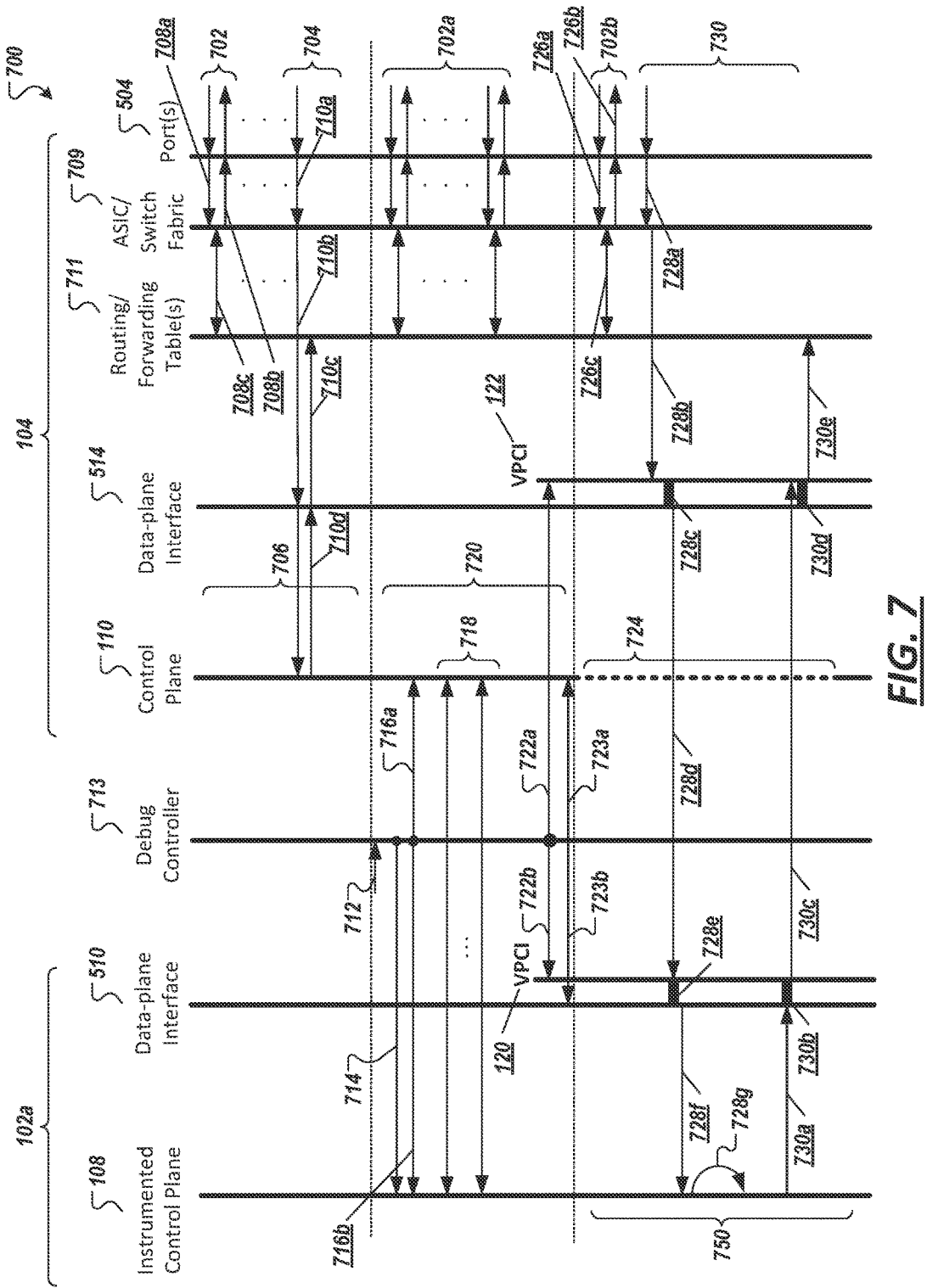
FIG. 7 shows an exemplary timing diagram of a stateful switchover operation between a target network device and a debug network device in accordance with an illustrative embodiment.

FIG. 7 shows an exemplary timing diagram 700 of a stateful switchover operation between a target network device 104 and a virtualized remote/cloud standby debug network device (shown as 102a) in accordance with an illustrative embodiment. Similar operations may be performed for other embodiments of the debug network device 102 as described herein.

In FIG. 7, prior (shown as 706) to a debug/profile operation, the target network device 104 is shown (702, 702a) to receive (708a) data packets at a port 504, which are routed (708b) by a data plane comprising a forwarding engine 709 (shown comprising "ASIC/Switch Fabric" 709) to another port (still shown as 504) using data-plane-associated resources 711 (shown as "Routing/Forwarding Tables" 711 via operation 708c). Also, in FIG. 7, for a control plane packet with a control plane update (e.g., a simple control plane update), the target network device 104 is shown (704) to receive the control plane packet at a port 504, which are routed (710a) through the forwarding engine 709 and routed (710b) through a bus interconnect 514 (shown as a "data-plane interface" 514) to the control plane 110 (e.g., comprising a host CPU). In this example, the control plane 110 then updates (710c) a data-plane resource 711 by writing (710d) to the data plane interface 514.

During a debug or profile operation, and as shown in FIG. 7, the operation is initiated at step 712 with a virtualized debug command being received (712) by a debug controller 713. In some embodiments, the debug controller 713 is an application executing on a processing core or logic circuit at the target network device 104. In other embodiments, the debug controller 713 is an application executing on the processing core or logic circuit at an external controller. In yet other embodiments, the debug controller 713 is a cloud-based application executing in a cloud infrastructure. The debug controller 713, in some embodiments, directs (714) the instantiation of a virtualized standby debug network device 102a in a remote or cloud infrastructure (e.g., remote or cloud server) (or other debug network device 102b, 102c) to provide a redundant and instrumented control plane 108 to the control plane 110. In some embodiments, the debug controller 713 directs the loading, at the debug network device 102a, of the system image (e.g., an instrumented version of the system image), control plane applications, or various applications executing on the target network device 104. In other embodiments, the debug controller 713 directs the control plane 108 to be instantiated with a pre-configured instrumented system image and/or instrumented application. In yet other embodiments, the debug controller 713 directs the creation of a control plane computing space to which various debugging or profiling software may be manually or subsequently installed by field engineers and/or TAC. In some embodiments, instances of virtualized standby switches are pre-instantiated in the remote or cloud infrastructure to which the debug controller 713 can then direct the assignment of a pre-instantiated virtualized standby switch to the active target network device 104.

Referring still to FIG. 7, the active target network device 104 (as a physical switch) and the virtualized standby debug network device 102a (or other debug network device 102b, 102c) form a stack, e.g., using a stacking mechanisms such as SVL or stacking cables. FIG. 7 shows the active target network device 104 and the virtualized standby debug network device 102a being directed to join in stacked mode with the active target network device 104 set in active mode (see 716a) and the virtualized standby debug network device 102a set in standby mode (716b).

The active target network device 104 then performs bulk synchronization operation of its control-plane state, as well as subsequent incremental synchronization (718), to the instrumented control plane 108 of the virtualized standby debug network device 102a.

During the initialization process (720), the control-plane-data-plane transport modules 120, 122 may be initialized (shown as 722a and 722b) in the respective active target network device 104 and the virtualized standby debug network device 102a. In some embodiments, the debug controller 713 pushes the instructions for the control-plane-data-plane transport modules 120,122, or its equivalent, to the active target network device 104 and virtualized standby debug network device 102a, e.g., as a part of the initialization process. In other embodiments, the system image for the active target network device 104 and virtualized standby debug network device 102a includes the instructions for the control-plane-data-plane transport modules to which the debug controller 713 can then initialize.

The initialization process (720) ends once both the control plane 110 of the active target network device 104 and the control plane 108 of the debug network device 102a are synchronized to have the same control-plane states, and the control-plane-data-plane transport modules 120, 122 are instantiated.

With the control-plane-data-plane transport modules 120, 122 executing transport bus interconnect transactions between the physical and virtualized network devices (102a, 104), the control plane 110 of the active target network device 104 (and not the data plane) then switches, via a switchover operation (shown as 723a, 723b) directed by the debug controller 713, from an active mode to a standby mode, and the control plane 108 of the debug network device 102a switches from the standby mode to the active mode. With the control plane 110 of the active target network device 104 being in the standby mode, it can then be disabled (shown as 724) or left running head-less. During the same time, the instrumentation of the control plane 108 or the instrumentation of the now active debug network device 102a may be executed to debug or profile 750 the control plane, data plane, and/or network operations of the target network device 104.

During this time, the data-plane 114 of the target network device 104 continues its forwarding operations of packets received there at, and any control plane associated updates (e.g., to the data plane tables and resources or the control plane) are made by the control plane 108 of the debug network device 102a by way of the control-plane-data-plane transport modules 120, 122. In some embodiments, while in the standby mode, the control plane 110 of the active target network device 104 may be rebooted and/or upgraded to a new system image.

In FIG. 7, after the switchover operation 723a, 723b, the data-plane 114 of the target network device 104 continues to service data plane packets received from the network. As shown, upon a data packet arriving (726a) at a port 504, the forwarding engine 709 continues to route (726b) the packet to another port 504 using (726c) data-plane-associated resources 711. And for control plane updates (730), the control plane 108 of the debug network device 102a initializes the process. In FIG. 7, an example is shown in which the target network device 104 receives (728a) the control plane packet at a port 504 (e.g., a "punt" packet for a OSPF update), which are routed (728b) through the forwarding engine 719 to the driver of a bus interconnect 514. However, rather than the control plane 110 of the target network device 104 reading the bus interconnect 514 (shown as data-plane interface 514), the control-plane-data-plane transport module 122 (vPCI 122) of the target network device 104 reads (728c) the write bus interconnect at the data plane interface 514 and transports (728d) the write transaction, as a message, through the network, or communication link, to the control-plane-data-plane transport module 120 of the control plane 108 of the debug network device 102a. The control-plane-data-plane interface transport module 120 (shown as vPCI 120) then writes (728e) a transaction to the bus interconnect comprising the data plane interface 510 of the control plane 108 of the debug network device 102a, which is then read (728f) by the control plane 108 to process (728g) the control plane update of the stack.

These data and control-plane packets may be received from peer network devices as well as enterprise-level network controllers (e.g., Cisco Digital Network Architecture (DNA) controller, OpenStack controller, or the like).

In instances where the control plane has a data plane update, the instrumented control plane 108 writes (730a) to the bus interconnect 510. The control-plane-data-plane interface transport module 120 reads (730b) the transaction and transports (730c) the transaction, as a message, through the network, to the control-plane-data-plane transport module 122 of the control plane 110 of the target network device 104. The control-plane-data-plane interface transport module 122 then writes (730d) the transaction to the bus interconnect 514 (as if written by the native control plane), which is written (730e) to the addressed data-plane resources.

It can be observed that even though the control plane 110 of the target network device 102a is in standby mode, the data plane 114 continues to maintain the same active mode. And, while the control plane 108 of the debug network device (e.g., 102a or 102c) is in active mode, the debug network device itself may not have a local data plane. The control plane 108 of the debug network device serves to temporarily maintain hitless or near-hitless control-plane operations and providing a space to perform the debugging or profiling operations.

In addition, the debugging and profiling 750 may be performed as many times as necessary to acquire the data log of interest or to recover the target network device 104, which may be span a few hours, days, or months. The logged data may be used to prepare patches or OS switch upgrades. In some embodiments, the logged data may be used in the design of future network devices. The debugging and profiling 750 may include the monitoring of any aspects of the various hardware and software components of the debug network device 102 and the target network device 104, e.g., as it handles received data or control plane updates or any other system operations.

In some embodiments, a second switchover operation may be performed (not shown) to restore the control plane 110 of the target network device 104 to active mode without any network interruption or disruption. This feature allows for the recovery of the target network device 104 without having to necessarily disrupt the network. The feature may be beneficial for minor updates or changes or to preserve continuous operation in real-time control operation, among other benefits.

Virtualized Debug Cloud Infrastructure

Figure 8:
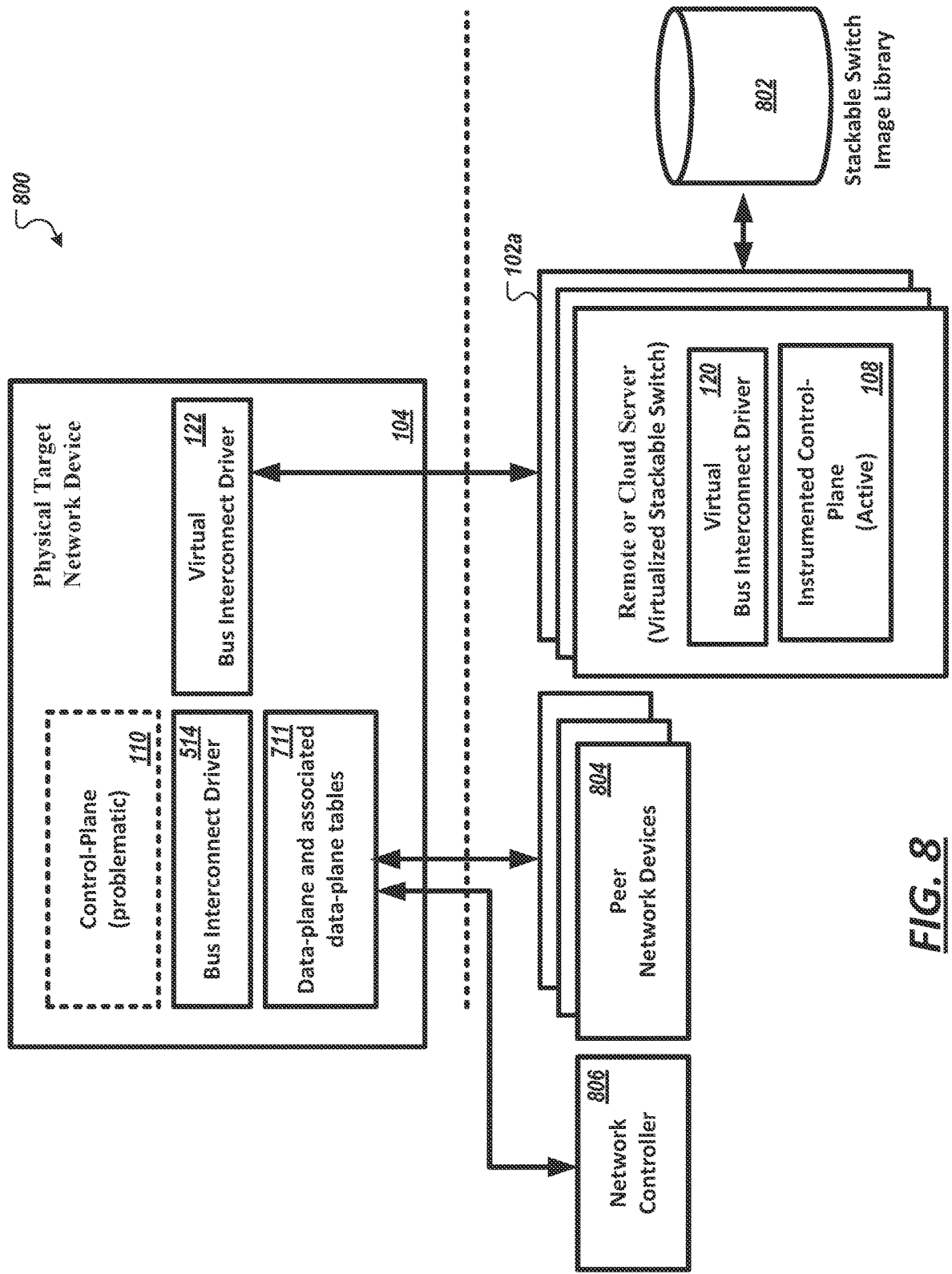
FIG. 8 shows a system configured to perform a debug or profile operation in a cloud server using the virtualized stateful switchover operation in accordance with an illustrative embodiment.

FIG. 8 shows a system 800 configured to perform a debug or profile operation in a cloud server using the virtualized stateful switchover operation in accordance with an illustrative embodiment.

As discussed above in relation to FIGS. 1-7, the debug or profile operation generally include instantiating a debug network device 102 (e.g., a virtualized debug network switch 102a) on a cloud or a local/remote server (or a debugging server) that has connectivity to a physical network device (e.g., an active stackable or non-stackable switch). The target network device and the debug network device then can form a stack using a stacking protocol and then switchover using SSO operations or like operations as provided in HA or ISSU technologies and the like to set the control plane of the debug network device in control of the data plane of the target network device.

In some embodiments, in addition to using switchover operations, the debug network device is further configured to execute both the control-plane software of the physical switch and the data-plane drivers, including, for example, forwarding engine driver (FED), forwarding engine SDK (software development kit), and ASIC drivers. In FIG. 8, the control plane software/instructions, as well as switchover instructions, and system images for the control plane of the debug network device, may be stored and retrieved from a stackable switch image library (shown as 802) or upgradable switch image library (e.g., for non-stackable switches). In some embodiments, the library 802 is stored in a remote or cloud server. An example of a remote or cloud image library system is Cisco Software Image Management (SWIM) system. In other embodiment, the library is a computer readable medium (e.g., DVD, CD, compact flash, and other persistent memory device). The images may be retrieved manually in some embodiments. In other embodiments, the images are retrieved in instructions set executing at a debug controller, e.g., as described in relation to FIG. 7.

Method of Setting Up a Virtualized Debug Switch

Figure 9:
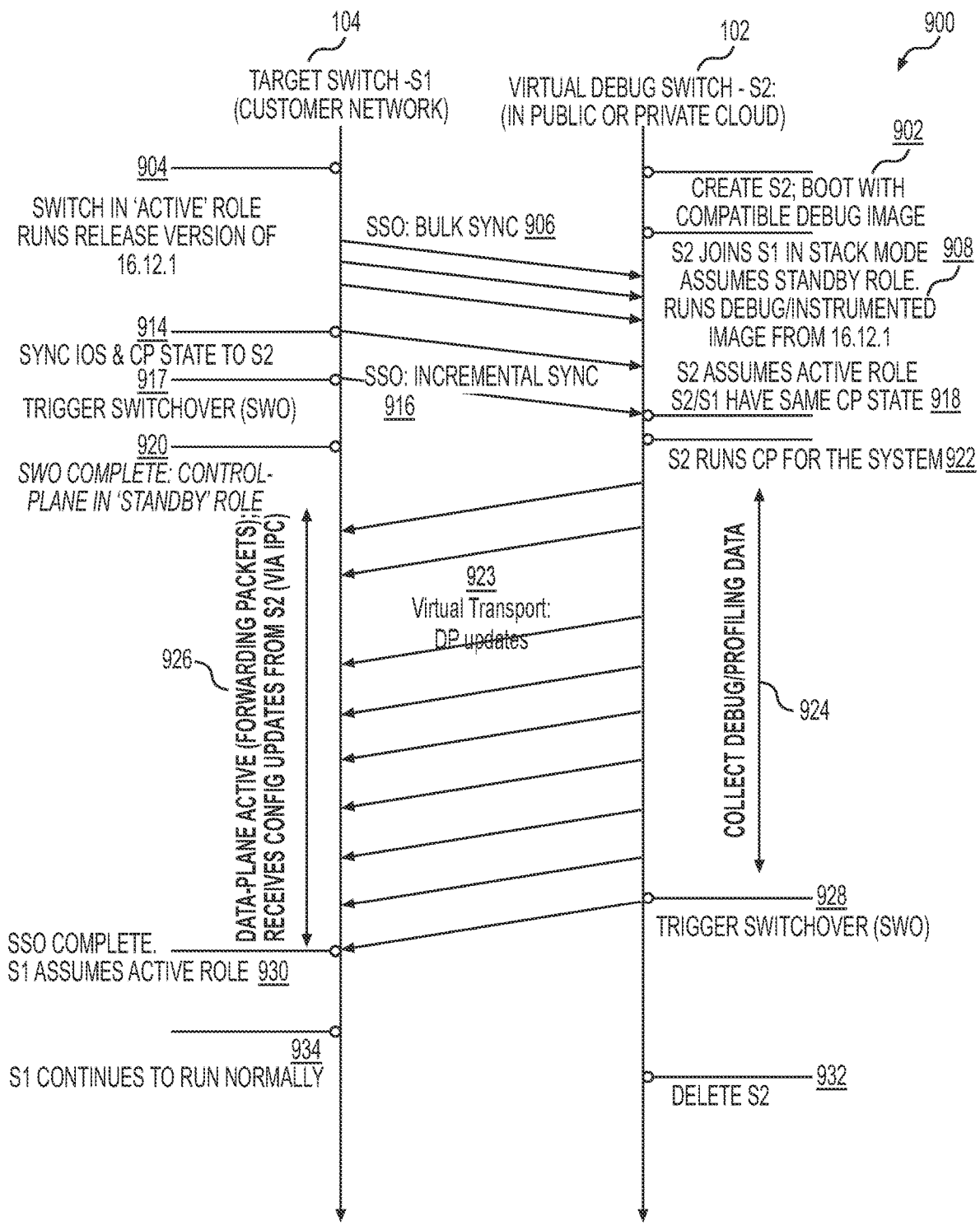
FIG. 9 shows an exemplary sequence to configure an exemplary debug network device and to perform debug or profile operation with that device in accordance with an illustrative embodiment.

FIG. 9 shows an exemplary sequence to configure an exemplary debug network device and to perform debug or profile operation with that device in accordance with an illustrative embodiment.

In FIG. 9, the process 900 is shown to include a debug network device 102 (shown as a virtualized debug switch "S2" 102a) being first instantiated (shown as "Create S2" 902) in a cloud, local, or remote machine to be used to debug or profile a target network device 104 (shown as target switch "S1" 104a). In other embodiments, other computing devices may be used to host the virtualized standby switch, including portable computing devices, custom server, or evaluation switch, as discussed herein.

The physical target switch "S1" 104a is shown initially running (904) in standalone mode. In FIG. 9, the target switch 104 is shown to be executing switch image version "16.12.1".

Upon the debugging operation being initialized, a virtual debug switch "S2" 102a is created. The creation of the virtual debug switch "S2" 102a includes the instantiation of a container or virtual machine in a cloud infrastructure. The container or VM includes an operating system, drivers, and control-plane application(s) corresponding to those executing on the target switch "S1" 104a. In some embodiments, the instantiation is directed by a debug controller, which may be executing on the physical switch "S1" or a remote computing device.

After the virtualized switch "S2" 102a is instantiated, the debug controller, or the like, may direct the target switch "S1" 104a and the debug switch "S2" 102a to be joined (908) via a stacking operation in a stack in which the debug switch "S2" 102a is initially put in standby mode and the target switch "S1" 104a is put in active mode (shown as "S2 joins S1 in stack mode" 908). During the stack joining process, bulk synchronization (the start is shown as 906 and the end is shown as 914) is performed. The virtualized standby debug switch "S2" 102a is shown executing the same or compatible system image as the target switch "S1" 104a, shown as switch image version "16.12.1". The virtualized standby debug switch "S2" 102a is further executing instrumentation in the system image or a control plane application. The bulk synchronization (906) synchronizes the control-plane states between the virtualized debug switch "S2" 102a and the target switch "S1" 104a so the control-plane states of the two switches "S1" and "S2" 102a, 104a are the same. Incremental synchronization may also be performed.

Once the control-plane states are synchronized to the same states, the debug controller triggers (917) a switchover (SSO) operation, and the debug switch "S2" 102a is directed to assume the active role while the target switch "S1" 104a assumes the standby role. Once in the active role, the debug switch "S2" 102a runs (922) as the control plane for the target switch "S1" 104a using the logical data-plane interface (e.g., vPCI), which may be initiated at this sequence or earlier as discussed herein. The control plane 108 of the debug switch "S2" 102a uses the logical data-plane interface to perform data-plane updates (923) to the data plane 114 of the target switch "S1" 104a (shown as "Virtual Transport: DP updates" 923). The debugging and/or profiling operation 924 is then performed on the control plane 108 of the debug switch "S2" 102a. The data-plane 114 continues to operate in the slave mode, shown for the duration 926, in which it is controlled by the control plane 108 of the debug switch "S2" 102a until the debugging or profiling operation (924) is complete.

In the example shown in FIG. 9, once the debugging is complete, the debugging controller directs a second switchover operation (928) and the control plane 108 of the debug switch "S2" 102a is put into standby mode while the control plane 110 of the target switch "S1" 104a is put into active mode (930). Target switch "S1" 104a now having been fixed can continue to run normally (934) while the virtualized debug switch "S2" 102a can be deleted (932).

To configure the logical data-plane interface, in some embodiments, the data-plane 110 of the target switch "S1" 104a may be programmed by the control plane 110 of the target switch "S1" 104 prior to that control plane 110 being designated to standby mode and under direction from the control plane 108 of the debug network device "S2" 102a. The programming ensures the association of resources and their addresses are consistent between the control-plane and data-plane on the target switch "S1" 104a and the debug switch "S2" 102a. Without the programming operation, the data-plane state may have different table indexes or addresses in the data-plane even though the control-plane state of the target and debug switches "S1" and "S2" 102a, 104a may be identical because the order of operations at the control-plane may not be preserved or performed in the same sequence. To optimize the programming of the data-plane device (e.g., 114) of the target switch "S1" 104a the data plane device (e.g., 114) may be programmed for only resources where such change is expected or had been made.

In yet another embodiment, the programming may involve generating an index translation table that translates addresses between i) old indexes associated with the data plane resource of the target switch "S1" 104a and ii) new indexes associated with the data plane resource of the debug switch "S2" 102a. The translation can improve the network/switch availability as the programming may be performed very quickly without having to write over data-plane resources of the target switch "S1" 104a. Indeed, once a mapping between old and new indexes are generated, 'read' and 'write' operations can go through the translation table, and the correct indexes/addresses can be accessed.

Discussion and Additional Examples

The exemplary system and method have many practical usages as described herein. While the debugging operation is on-going, the target network device can maintain comparable throughput while being serviced by the instrumented control plane, even though latency performance may vary. Network protocols typically have timeout in the order of multiple seconds, and so, the additional latency may not necessarily impact protocol operation. Route updates and MAC learning may take more time, but again, may have limited impact on data plane operations.

Indeed, the exemplary system and method provides for the on-demand creation of an instrumented control-plane, e.g., in the cloud or remote server or other platform, and ability to form a stack with a non-instrumented production image on a physical target switch. This setup is equivalent to, and will act like an HA system.

In addition, stacking and SSO are generally used for high-availability in switches. The exemplary system and method may use conventional or existing stacking and SSO in a debugging operation, e.g., for debugging and profiling of live systems.

In addition, while debug and profiling are often intrusive and performance impacting, the exemplary system and method may be used by TAC/field-support in customer networks, e.g., to evaluate common issues as well difficult issues that are not so readily reproduce-able in labs, without any noticeable impact in performance or latency.

In addition, stacking, SSO and CNF (Cache & Flush) operations are used in conjunction with fast software upgrade (FSU/xFSU) operation to reduce outage for non-redundant systems. The exemplary system and method may employ these operations, in addition, to recover and restore problematic switches in live customer networks and in a near hit-less fashion. Once a debug network device is created on-demand, it may form a stack with physical target network device. SSO operation as described herein may be used to synchronize the states of the target network device to the debug network device. At this point, a switchover is performed, and the instrumented control plane of the debug network device is set to active mode. Subsequent control traffic intended for the control plane of the target network device can be redirected (not mirrored) to the debug network device, e.g., via a tunnel. Most of the use-cases do not require mirroring of control-plane traffic, though it can. This would be similar operation to any HA system.

Data-plane traffic does not require mirroring as well. Because the data-plane in the physical target switch remains functional, traffic forwarding continues to perform through this hardware. In use cases where debugging or profiling of the data-plane (e.g., NPU and ASIC logic) is desired, the debug network device can be configured to execute its data-plane (e.g., through simulator or emulator models). For data-plane debugging of a target device, a subset of data-plane traffic may be mirrored to the cloud switch. Such a data-plane debug may require only a small set of packets and can provide very detailed functional trace and logs of a packet through the ASIC (for e.g., using cycle-accurate simulator models such as RTL emulators).

In addition, the exemplary method and system facilitates the debugging in a passive mode, where the physical target network device is unmodified/untouched, and a debug machine, while still in stack configuration with target network device, is running on separate hardware and in parallel. In this mode, control-plane traffic can be mirrored. The operation may involve processes that are HA-aware and in hot-standby.

In addition, on-demand creation of a standby switch in a remote/cloud network can be used for many other applications, e.g., to profile and troubleshoot issues in live customer switches by spawning a standby instrumented control-plane without impacting performance. It can also be used for quick troubleshoot session with the goal of saving cost. The operation can be performed by hitless operation is needed for both control plane and data plane, e.g., in certain real-time control application where real-time network must be maintained. In addition, the exemplary method and system can facilitate the restoration of faulty systems in customer networks (that would normally require a reboot) with near-hitless traffic disruption. In addition, the exemplary method and system can be automated and tied with DNAC or other network management workflow. In addition, the exemplary method and system can used to test a new image/release in customer networks prior to full release.

Indeed, if the new image fails, HA infrastructure provides protection and performs a hit-less switchover to the control-plane on the physical switch. This is a near hitless ISSU with rollback, even for non-redundant systems.

It should be understood that the various techniques and modules described herein, including the control-plane-data-plane interface transport module may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Embodiments of the network device may be implemented, in whole or in part, in virtualized network hardware in addition to physical hardware.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents.

What is claimed is:

1. A method to establish a debugging cloud or remote infrastructure for a network device, the method comprising:
instantiating, at a remote or cloud computing device, a virtualized network device with an operating image of a target network device, wherein the virtualized network device is configured, by software instructions or hardware, to execute one or more debugging processes not executing on the target network device, and wherein the target network device comprises a first control plane and data plane that is receiving and forwarding network traffic in a network;
joining the virtualized network device and the target network device in a stack configuration to synchronize states of the first control plane of the target network device to a second control plane of the virtualized network device, wherein the first control plane of the target network device is initially executing in an active stacked configuration, and wherein the second control plane of the virtualized network device is initially executing in a standby stacked configuration; and triggering a switchover operation, wherein the switchover operation switches the first control plane of the target network device from the active stacked configuration to the standby stacked configuration and disconnects the first control plane from updating the data plane of the target network device, wherein the switchover operation switches the second control plane of the virtualized network device from the standby stacked configuration to the active stacked configuration, and wherein the second control plane in the active stacked configuration is connected to the data plane over a network connection and updates the data plane, wherein the one or more debugging processes are operatively executed concurrently with the second control plane of the virtualized network device to evaluate at least one of: i) said second control plane, ii) a hardware or firmware configuration of the target network device, and iii) the network.

2. The method of claim 1, wherein the one or more debugging processes of the virtualized network device are used to profile the target network device or the network to restore the target network device from an error or invalidate state associated with the data plane and/or the control plane.

3. The method of claim 2, wherein the one or more debugging processes are associated with at least one analysis tool.

4. The method of claim 3, wherein instantiating the virtualized network device is performed dynamically, the method further comprising:
deleting the virtualized network device at the remote or cloud computing device following the evaluation and restoration of the target network device.

5. The method of claim 1, wherein the one or more debugging processes are used to profile the target network device or the network to optimize data plane configuration and/or control plane configuration of the target network device.

6. The method of claim 1, wherein the one or more debugging processes are used to profile the target network device or the network to optimize network operation, a network policy, or a network configuration.

7. The method of claim 1, wherein the second control plane in the active stacked configuration provides operation for the target network device as the second control plane of the target network device is being debugged by the one or more debug processes executing at the virtualized network device.

8. The method of claim 1, wherein the operating image comprises a non-instrumented production image.

9. The method of claim 1, wherein the target network device comprises a non-redundant switch.

10. The method of claim 1, wherein the target network device comprises a redundant switch.

11. The method of claim 1, wherein the joining operation is performed via stacking technologies.

12. The method of claim 1, wherein the switchover operation is performed via a stateful switchover (SSO) operation or via at least one of high availability (HA) technologies or in-service software upgrade (ISSU) technologies.

13. The method of claim 1, wherein the virtualized network device further comprises an instrumented data plane comprising data plane components and additional instrumentation to access the data plane components, and wherein the one or more debugging processes or the additional instrumentation are configured to transmit one or more debug packets into the data plane component, and wherein the instrumentation is configured to provide logging and/or analysis of said one or more debug packets.

14. The method of claim 1, wherein the remote or cloud computing device comprises:
a cloud server;
a remote server;
an evaluation platform for the target network device; or
a custom computing server comprising one or more debugging or evaluation sub-systems.

15. The method of claim 1 wherein instantiating the virtualized network device comprises:
retrieving the operating image of the target network device from an image server; and orchestrating a virtualized environment with an operating system and environment using the retrieved operating image.

16. The method of claim 1 further comprising:
establishing a tunnel connection or a direct connection between the virtualized network device and the target network device when joining the virtualized network device and the target network device, wherein the tunnel connection or the direct connection is used as the network connection for the virtualized network device to update the data plane of the target network device.

17. A system comprising:
a host processor; and
a memory having computer readable instructions, wherein execution of the computer readable instruction, cause the host processor to:
instantiate, at a remote or cloud computing device, a virtualized network device with an operating image of a target network device, wherein the virtualized network device is configured, by software instructions or hardware, to execute one or more debugging processes not executing on the target network device, and wherein the target network device comprises a first control plane and data plane that is receiving and forwarding network traffic in a network;
join the virtualized network device and the target network device in a stack configuration to synchronize states of the first control plane of the target network device to a second control plane of the virtualized network device, wherein the first control plane of the target network device is initially executing in an active stacked configuration, and wherein the second control plane of the virtualized network device is initially executing in a standby stacked configuration; and
trigger a switchover operation, wherein the first control plane of the target network device is switched from the active stacked configuration to the standby stacked configuration and disconnected from updating the data plane of the target network device, and wherein the second control plane of the virtualized network device is switched from the standby stacked configuration to the active stacked configuration and connected, over a network connection, to update the data plane of the target network device,
wherein the one or more debugging processes is operatively executed concurrently with the second control plane of the virtualized network device to evaluate at least one of: i) said second control plane, ii) a hardware or firmware configuration of the target network device, and iii) the network.

18. The system of claim 17, wherein the instructions, when executed by the host processor, further cause the host processor to:

execute the one or more debugging processes to restore the target network device from a detected error or invalidate state associated with the data plane and/or control plane of the target network device.

19. The system of claim 17, wherein the system is configured to:
read a set of bus-interconnect transactions from a bus interconnect of the target network device and transmit the set of bus-interconnect transactions as a set of data-plane transaction messages to the virtualized network device over a network interface, wherein the virtualized network device is configured to use the set of data-plane transaction messages to write the set of bus-interconnect transactions to the bus interconnect or to a host processor of the virtualized network device to update control plane states maintained by the virtualized network device; and
write a second set of bus-interconnect transactions to the bus-interconnect of the target network device based on a second set of data-plane transaction messages received from the virtualized network device over the network interface, wherein the second set of bus-interconnect transactions updates a portion of a plurality of data-plane-associated tables of the target network device.

20. A non-transitory computer-readable medium with instructions stored thereon, wherein execution of the instructions by a processor, cause the processor to:
instantiate, at a remote or cloud computing device, a virtualized network device with an operating image of a target network device, wherein the virtualized network device is configured, by software instructions or hardware, to execute one or more debugging processes not executing on the target network device, and wherein the target network device comprises a first control plane and data plane that is receiving and forwarding network traffic in a network;
join the virtualized network device and the target network device in a stack configuration to synchronize states of the first control plane of the target network device to a second control plane of the virtualized network device, wherein the first control plane of the target network device is initially executing in an active stacked configuration, and wherein the second control plane of the virtualized network device is initially executing in a standby stacked configuration;
trigger a switchover operation wherein the first control plane of the target network device is switched from the active stacked configuration to the standby stacked configuration and disconnected from updating the data plane of the target network device, and wherein the second control plane of the virtualized network device is switched from the standby stacked configuration to the active stacked configuration and connected, over a network connection, to update the data plane of the target network device,
wherein the one or more debugging processes is operatively executed concurrently with the second control plane of the virtualized network device to evaluate at least one of: i) said second control plane, ii) a hardware or firmware configuration of the target network device, and iii) the network.

* * * * *